United States Patent [19]

Higashiguchi et al.

[11] Patent Number: 4,535,044

[45] Date of Patent: Aug. 13, 1985

[54] PHOTOSENSITIVE MATERIAL FOR ELECTROPHOTOGRAPHY CONTAINING PHOTOSENSITIVE LAYER INCORPORATING PENTAKISAZO PIGMENT

[75] Inventors: Teruaki Higashiguchi, Tokyo; Nobuhiro Miyakawa, Abiko, both of Japan

[73] Assignee: Mita Industrial Co., Ltd., Osaka, Japan

[21] Appl. No.: 492,959

[22] Filed: May 9, 1983

[30] Foreign Application Priority Data

May 10, 1982 [JP] Japan ................................. 57-76497

[51] Int. Cl.³ ........................... G03G 5/06; G03G 5/10
[52] U.S. Cl. ...................................... 430/58; 430/73; 430/75; 430/76; 430/78; 430/79; 430/72; 534/653; 534/755; 534/805
[58] Field of Search ...................... 430/58, 59, 73, 72, 430/75, 78, 76, 79; 260/144, 152, 164, 165

[56] References Cited

U.S. PATENT DOCUMENTS

| | | | |
|---|---|---|---|
| 1,785,845 | 12/1930 | Stuesser | 430/73 |
| 1,913,382 | 6/1933 | Gubelmann et al. | 252/299.1 |
| 2,203,196 | 6/1940 | Hanhart | 260/143 |
| 2,286,714 | 6/1942 | Chechak | 260/143 |
| 3,898,084 | 8/1975 | Champ et al. | 430/73 |
| 3,969,339 | 7/1976 | Sailer et al. | 428/473 |
| 3,977,870 | 8/1976 | Rochlitz | 430/58 |
| 4,123,270 | 10/1978 | Heil et al. | 430/58 |
| 4,169,831 | 7/1979 | Frank et al. | 260/159 |
| 4,179,395 | 12/1979 | Cole et al. | 350/349 |
| 4,279,981 | 7/1981 | Ohta et al. | 430/73 |
| 4,286,040 | 8/1981 | Van Lomm | 430/58 |
| 4,359,398 | 11/1983 | Cole et al. | 252/299.1 |

FOREIGN PATENT DOCUMENTS 58-44443  1/1983  Japan.

Primary Examiner—John L. Goodrow
Attorney, Agent, or Firm—Sherman & Shalloway

[57] ABSTRACT

Disclosed is a photosensitive material for electrophotography containing a pentakisazo pigment of the following formula:

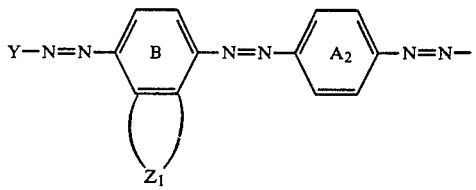

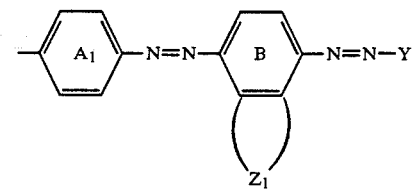

wherein the rings $A_1$ and $A_2$ may have halogen atoms, alkyl groups or alkoxy groups as substituents at the ortho-positions to the azo groups, the ring B may have a halogen atom, an alkyl group or an alkoxy group as a substituent or may contain the ring $Z_1$, $Z_1$ which is an aromatic or hetero ring fused to the benzene ring B, and Y stands for a group of the following formula:

(Abstract continued on next page.)

-continued

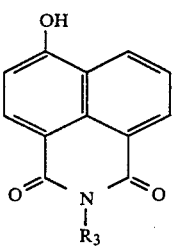

in which $Z_2$ stands for an aromatic ring or a hetero ring, $Ar_1$ stands for an aromatic ring or a hetero ring, $Ar_2$ and $Ar_3$ stand for an aromatic ring, $R_0$ stands for a hydrogen atom, a lower alkyl group or a phenyl group, $R_1$ stands for a lower alkyl group, a carboxyl group or an ester thereof, and $R_2$ and $R_3$ stand for a hydrogen atom, a lower alkyl group, a phenyl group or a substituted derivative thereof.

14 Claims, 2 Drawing Figures

PHOTOSENSITIVE MATERIAL FOR ELECTROPHOTOGRAPHY CONTAINING PHOTOSENSITIVE LAYER INCORPORATING PENTAKISAZO PIGMENT

BACKGROUND OF THE INVENTION (1) Field of the Invention:

The present invention relates to a photosensitive material for electrophotography, which comprises a pentakisazo pigment in a photosensitive layer.

(2) Description of the Prior Art:

It has been known from old that disazo pigments are valuable as photoconductive substances for electrophotographic photosensitive materials (see, for example, Japanese Patent Application Laid-Open Specification No. 37453/72). For example, it is known that trisazo pigments derived from triphenyl methane and azoxybis-(azobenzene) pigments may be used as photoconductive pigments. In the field of electrophotography, however, it is always required to broaden the sensitive wavelength region and increase the copying speed. Therefore, development of photoconductive pigments having a high sensitivity and a broad sensitive wavelength region has been desired.

SUMMARY OF THE INVENTION

We found that a specific pentakisazo pigment described in detail hereinafter has a broad sensitive wavelength region and an excellent fastness and is very valuable as an organic photoconductive pigment. We have now completed the present invention based on this finding.

More specifically, in accordance with the present invention, there is provided a photosensitive material for electrophotography, which comprises a photosensitive layer containing a pentakisazo pigment represented by the following formula:

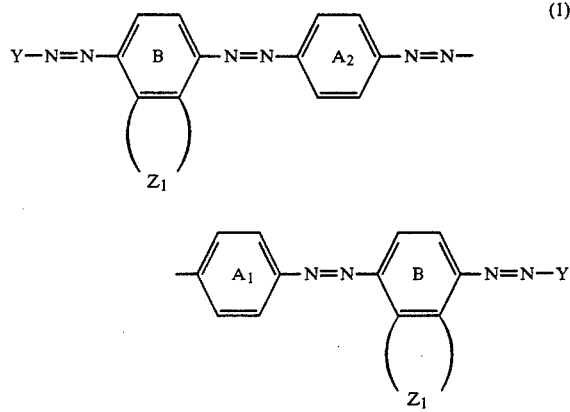

wherein the rings $A_1$ and $A_2$ may have halogen atoms, alkyl groups or alkoxy groups as substituents at the ortho-positions to the azo groups, the ring B may have a halogen atom, an alkyl group or an alkoxy group as a substituent or may contain the ring $Z_1$, $Z_1$ stands for an aromatic or hetero ring fused to the benzene ring B such as a benzene ring, a naphthalene ring, an indole ring, a carbazole ring or a benzofuran ring, or substituted derivative thereof and Y stands for a group represented by the following formula:

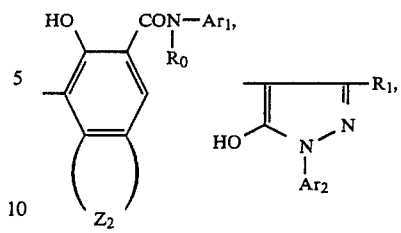

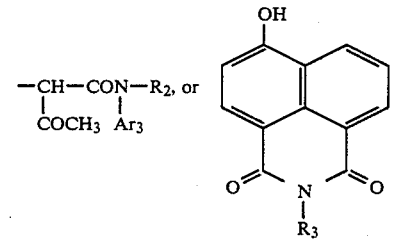

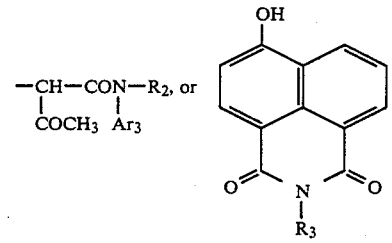

in which $Z_2$ stands for an aromatic ring such as a benzene ring or a naphthalene ring, a hetero ring such as an indole ring, a carbazole ring or a benzofuran ring or a substituted derivative thereof, $Ar_1$ stands for an aromatic ring such as a benzene ring or a naphthalene ring, a hetero ring such as a benzofuran ring or a carbazole ring or a substituted derivative thereof, $Ar_2$ and $Ar_3$ stand for an aromatic ring such as a benzene ring or a naphthalene ring or a substituted derivative thereof, $R_0$ stands for a hydrogen atom, a lower alkyl group or a phenyl group, $R_1$ stands for a lower alkyl group, a carboxyl group or an ester thereof, and $R_2$ and $R_3$ stand for a hydrogen atom, a lower alkyl group, a phenyl group or a substituted derivative thereof.

DETAILED DESCRIPTION OF THE PREFERRED EMBODIMENTS

The pentakisazo pigment that is used in the present invention has a structure formed by coupling an azobenzene tetrazonium salt represented by the following formula:

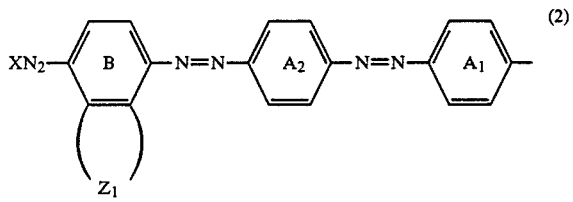

-continued

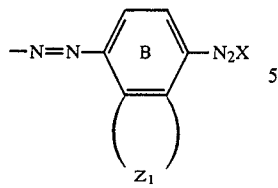 (2)

wherein the rings $A_1$, $A_2$, B and $Z_1$ are defined above, and X stands for an anion,
with a coupling component represented by the following formula:

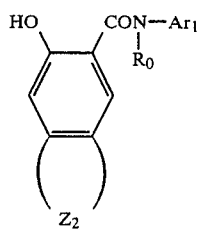 (3)

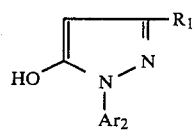 (4)

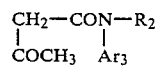 (5)

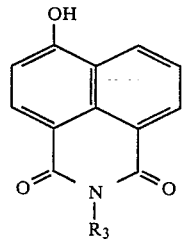 (6)

wherein $Z_2$, $Ar_1$, $Ar_2$, $Ar_3$, $R_0$, $R_1$, $R_2$ and $R_3$ are as defined above.

Figure 1:
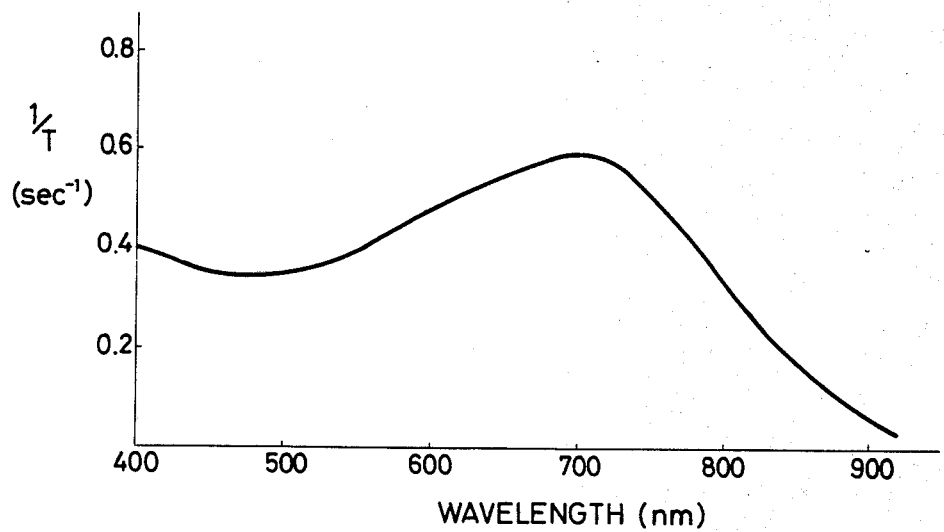
FIG. 1 is a diagram illustrating the spectral sensitivity of a laminated photosensitive material comprising pentakisazo pigment No. 1 according to the present invention.

The photosensitive material comprising this pentakisazo pigment is characterized in that as shown in FIG. 1, it has a spectral sensitivity in the wavelength region of 400 to 900 nm and has an especially excellent sensitivity to near infrared rays and infrared rays. Accordingly, the electrophotographic photosensitive material comprising this pentakisazo pigment can be used effectively not only as a photosensitive material for ordinary electrophotographic reproduction or electrophotographic printing but also as a photosensitive material for a laser printer. This pentakisazo pigment has a good fastness to rays, discharge and ozone, and a photosensitive material excellent in the resistance to the printing operation can be provided by using this pentakisazo pigment.

The tetrazonium salt represented by the general formula (2) is prepared by the following process.

More specifically, the tetrazonium salt can easily be obtained by tetrazotizing a diaminoazobenzene represented by the following formula:

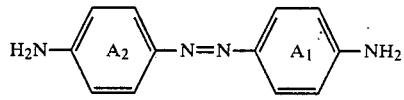 (7)

wherein the rings $A_1$ and $A_2$ are as defined above, according to a customary method using sodium nitrite, coupling the obtained tetrazonium salt with an amino compound represented by the following formula:

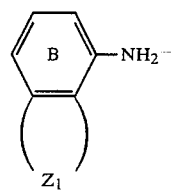 (8)

wherein the rings B and $Z_1$ are as defined above, as a coupling component under an acidic condition in an appropriate solvent, and tetrazotizing the coupling product according to customary procedures.

Compounds described below are effectively used as the diaminobenzene represented by the general formula (7), though compounds that can be used in the present invention are not limited to those exemplified below.

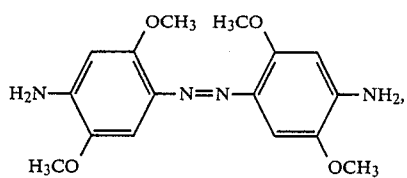

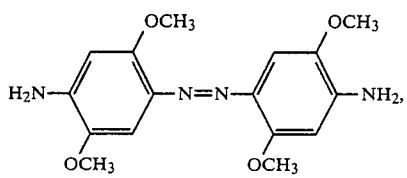

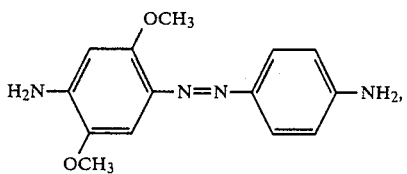

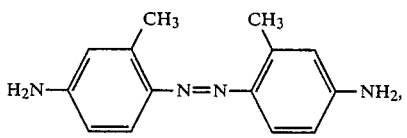

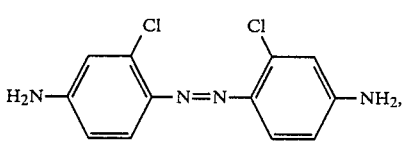

-continued

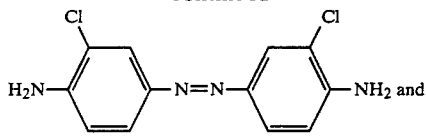

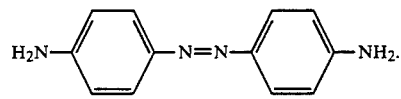

As preferred examples of the azo coupling component of the general formula (8), an aminonaphthalene and the like can be used.

In short, the tetrazonium salt represented by the general formula (2) can be obtained by coupling a diaminoazobenzene represented by the general formula (7) with an amino compound represented by the general formula (8) under an acidic condition and tetrazotizing the coupling product.

The pentakisazo pigment used in the present invention can easily be obtained by coupling the so-obtained tetrazonium salt represented by the general formula (2) with a coupling component of the general formula (3), (4), (5) or (6) in the presence of an alkali in an appropriate solvent such as dimethylformamide.

As the coupling components of the general formulae (3) through (6), the following compounds are preferably used, though compounds that can be used are not limited to those exemplified below:

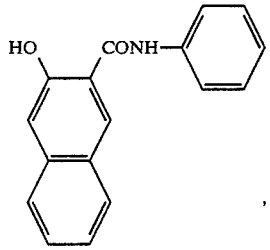

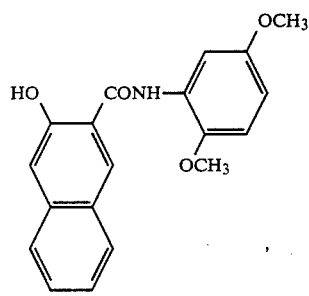

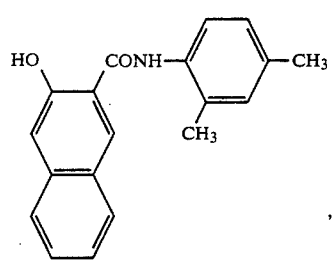

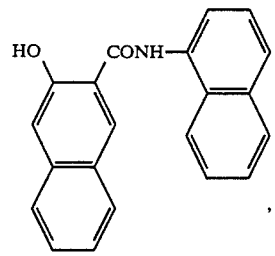

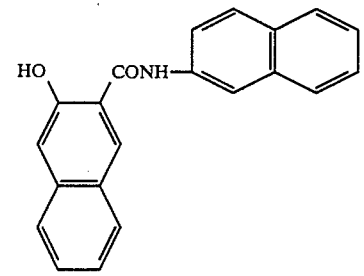

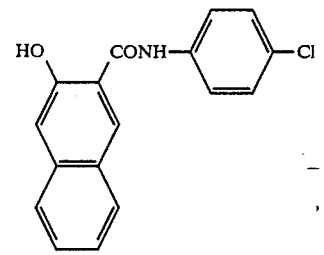

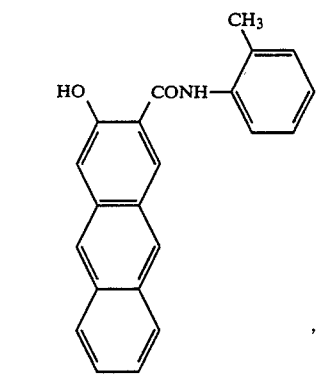

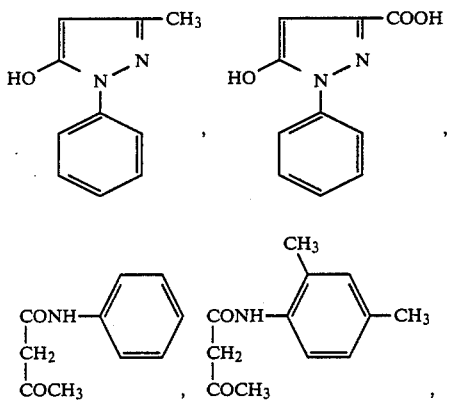

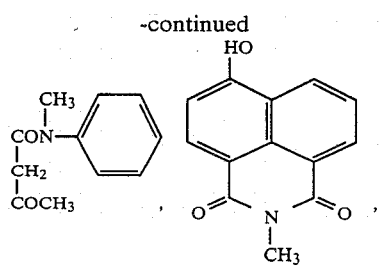
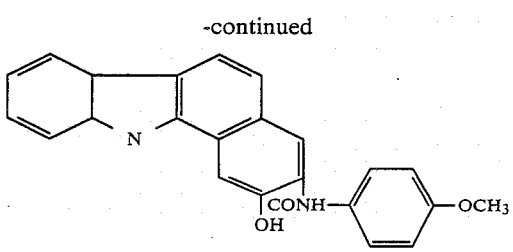
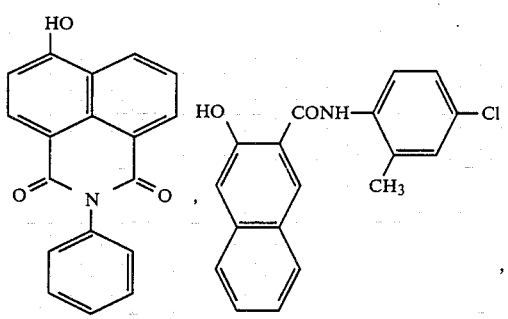
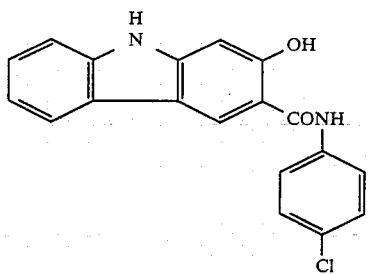
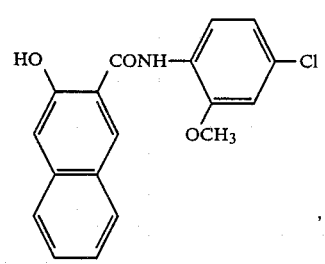
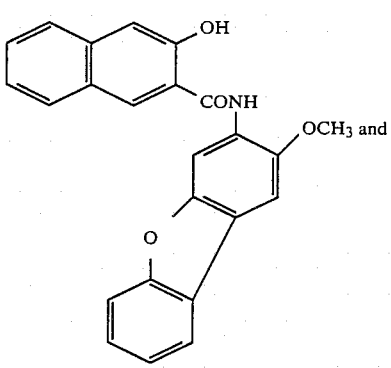
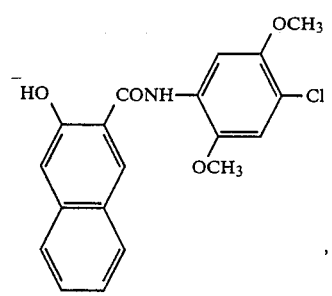
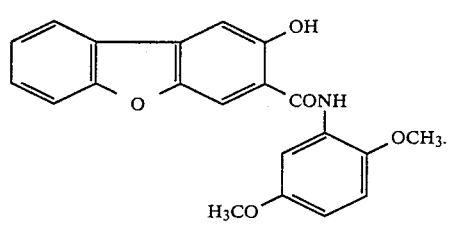
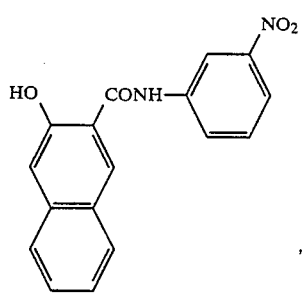
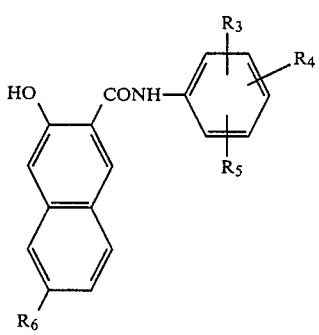
In general, the preferred coupling components of formula (3) are compounds represented by the following formula:
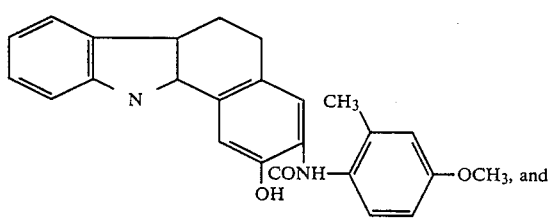
in which $R_3$, $R_4$ and $R_5$ stand for —H, —CH$_3$, —OCH$_3$, —OC$_2$H$_5$, NO$_2$, —Cl or —Br, stands for —H, Cl or —Br.

In the electrophotographic photosensitive material of the present invention, the pentakisazo pigment can be used in various modes, so far as the pentakisazo pigment is contained in the photosensitive layer. For example, the pentakisazo pigment is dispersed as a photoconductive pigment in an electrically insulating binder medium and the composition is applied as a photoconductive layer on an electroconductive substrate. It is preferred that the pentakisazo pigment be so finely dispersed that the particle size is less than 5 microns, especially less than 2 microns. In this embodiment, as the electrically insulating binder medium, there can be used a polyester resin, an acrylic resin, a styrene resin, an epoxy resin, a polycarbonate resin, a silicone resin, an alkyd resin and a vinyl chloride-vinyl acetate copolymer. It is preferred that the pentakisazo pigment be used in an amount of 5 to 100 parts by weight, especially 10 to 50 parts by weight, per 100 parts by weight of the binder. A metal substrate in the form of a sheet or drum or a paper which has been rendered electrically conductive is used as the electroconductive substrate. It is preferred that the amount coated of the photoconductive layer be 3 to 20 g/m$^2$, especially 5 to 10 g/m$^2$, on the dry basis.

In accordance with another embodiment of the present invention, the pentakisazo pigment is dispersed as a charge generating pigment in a charge transport substance and the composition is applied as a photosensitive layer to an electroconductive substrate. Any of known hole transport substances and electron transport substances can be used for attaining the object of the present invention. As preferred examples of the hole transport substance, there can be mentioned poly-N-vinylcarbazole, phenanthrene, N-ethylcarbazole, 2,5-diphenyl-1,3,4-oxadiazole, 2,5-bis-(4-diethylaminophenyl)-1,3,4-oxadiazole, bis-diethylaminophenyl-1,3,6-oxidiazole, 4,4'-bis-(diethylamino-2,2'-dimethyltriphenyl)methane, 2,4,5-triaminophenylimidazole, 2,5-bis-(4-diethylaminophenyl)-1,3,4-triazole, 1-phenyl-3-(4-diethylaminostyryl)-5-(4-diethylaminophenyl)-2-pyrazoline and p-diethylaminobenzaldehydo-(diphenylhydrazone). As preferred examples of electron transport substances, there can be mentioned 2-nitro-9-fluorenone, 2,7-dinitro-9-fluorenone, 2,4,7-trinitro-9-fluorenone, 2,4,5,7-tetranitro-9-fluorenone, 2-nitrobenzothiophene, 2,4,8-trinitroxanthone, dinitroanthracene, dinitroacridine, dinitroanthraquinone and tetracyanoqunodimethane. These substances may be used singly or in the form of mixtures of two or more of them. Of course, there may be adopted a method in which a complex of an electron acceptor and an electron donor is used as the charge transport substance so that both the holes and electrons can be transported.

When the charge transport substance is a lowmolecular-weight substance, it is necessary that the charge transport substance should be used in the state dispersed in a binder resin as described hereinbefore. Even if the charge transport substance is a polymeric substance having a binding property, in order to reinforce the mechanical properties and enhance the adhesiveness, it is preferred that a binder resin as described hereinbefore be used.

In this embodiment, it is preferred that the pentakisazo pigment be used as a charge generating agent in an amount of 1 to 30 parts by weight, especially 2 to 20 parts by weight, per 100 parts by weight of the entire photosensitive layer.

In accordance with still another embodiment of the present invention, a charge generating layer containing the pentakisazo pigment is formed on an electroconductive substrate and a charge transport layer is formed on the charge generating layer. The charge generating layer may be formed by vacuum deposition of the pentakisazo pigment or coating and drying of a dispersion of the pentakisazo pigment in an appropriate organic solvent. Furthermore, as in the above-mentioned first embodiment, a composition formed by dispersing the pentakisazo pigment in a binder resin may be coated on an electroconductive substrate to form a charge generating layer. The charge transport layer can easily be formed by coating a charge transport substance as mentioned with reference to the above-mentioned second embodiment. The thickness of the charge generating layer may be changed in the range of 0.1 micron in case of vacuum deposition to 3 microns in case of coating of the resin-pigment dispersion. It is preferred that the thickness of the charge transport layer be 5 to 30 microns.

The pentakisazo pigment of the present invention shows an especially excellent sensitivity when used for a photosensitive layer of the third type, that is, a function-separated photosensitive layer comprising a charge generating layer and a charge transport layer.

The electrophotographic photosensitive material of the present invention can be applied to the electrophotographic process in which the photosensitive layer is subjected to positive or negative corona discharge to charge the surface of the photosensitive layer and the charged surface of the photosensitive layer is subjected to imagewise light exposure to form an electrostatic latent image. Of the electrophotographic photosensitive materials of the present invention, the first and second types are advantageously used for the positive charging and the third type is advantageously used for the negative charging.

The present invention will now be described in detail with reference to the following Examples that by no means limit the scope of the invention.

SYNTHESIS EXAMPLE (1) In 50 ml of 18N hydrochloric acid was dissolved 2.12 g (0.01 mole) of 4,4'-diaminoazobenzene, and the solution was cooled to 5° to 10° C. Then, 4.5 ml of a 5N aqueous solution of sodium nitrite was added to the above solution with stirring and diazotization was carried out for 1 hour. The reaction mixture was filtered and zinc chloride was added to the filtrate to stabilize the diazonium salt by forming a double salt. The pH value of the filtrate was adjusted to 3 to 4 by addition of a 5N aqueous solution of sodium acetate, and 3.00 g (0.021 mole) of α-naphthylamine was dissolved in 100 ml of a dilute aqueous solution of hydrochloric acid and the diazonium salt solution was gradually added to the soformed solution. After completion of the coupling reaction, the reaction mixture was allowed to stand still for a while and was then heated. The pigment crystal was recovered by filtration, washed with water, acetone and ethanol and dried in vacuo to obtain 4.38 g of a reddish black trisazo pigment.

Yield: 4.38 g (84.2% of the theoretical yield)
Appearance: reddish black crystal
IR Spectrum:

3400-3350 cm$^{-1}$    $\nu$-NH 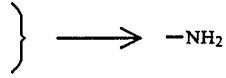

| | |
|---|---|
| 1650 cm⁻¹ | δ-NH |
| 750 cm⁻¹ | δ-CH |

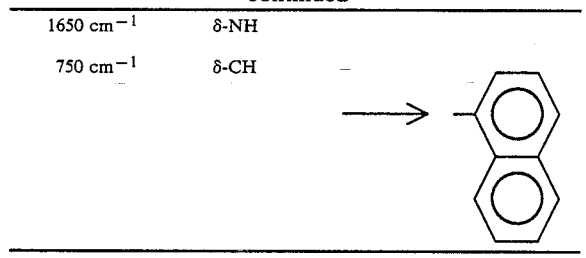

Elementary Analysis Values:
Calculated: C=73.84%, H=4.62%, N=21.54%,
Found: C=74.10%, H=4.53%, N=21.37%.
Structural Formula:

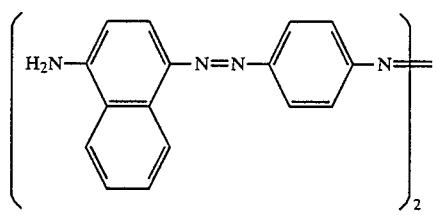

(2) In a mortar, 2.60 g (0.005 mole) of the trisazo pigment synthesized in (1) above was sufficiently crushed to obtain a fine powder.

In 10 ml of sulfuric acid was dissolved 0.5 g of powdery sodium nitrite under heating, and the solution was cooled to 5° to 10° C. The crushed pigment was added little by little with stirring and diazotization was carried out for 1 hour. Then, the diazotized solution was neutralized with a dilute alkali solution to adjust the pH value to about 4. Separately, 3.06 g (0.0105 mole) of Coupler As-Mx (3-hydroxy-2-naphtho2',4'-xylidide) was dissolved with stirring in a liquid mixture comprising 100 ml of N,N-dimethylformamide, 100 ml of a 5N aqueous solution of sodium acetate and 5 ml of a 5N aqueous solution of sodium hydroxide, and the solution was cooled to 10° to 15° C. The diazotized solution was gradually added to the so-formed coupler solution to effect coupling reaction. After completion of the coupling reaction, the pH value of the solution was adjusted to 8 to 9 and the solution was allowed to stand still for a while. Then, the pH value was adjusted to about 4 by addition of a dilute aqueous solution of hydrochloric acid, followed by heating. The pigment crystal was recovered by filtration, washed with water, acetone and ethanol and dried in vacuo to obtain 4.66 g of a blackish green pentakisazo pigment.

Yield: 4.66 g (83.0% of the theoretical value)
Appearance: blackish green crystal
IR Spectrum:

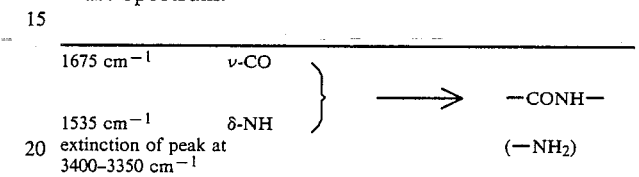

Elementary Analysis Values:
Calculated: C=74.71%, H=4.62%, O=5.73%, N=14.94%,
Found: C=74.87%, H=4.83%, O=5.57%, N=14.73%.
Structural Formula:

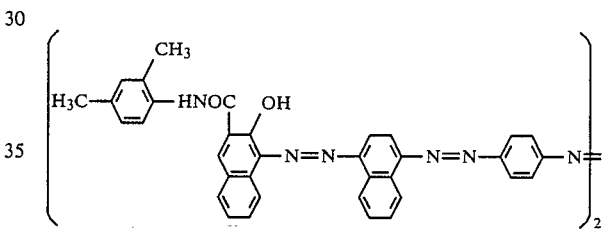

The following pentakisazo pigments were prepared according to the same method described in the Synthesis Example.

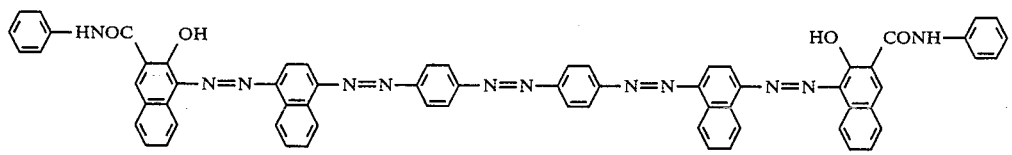
2.

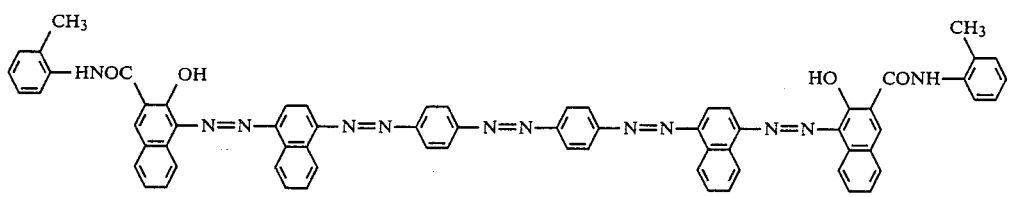
3.

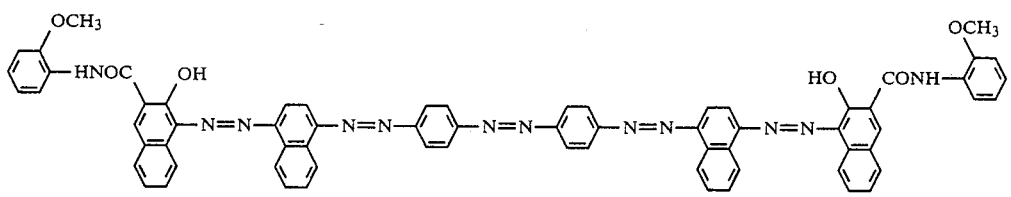
4.

-continued
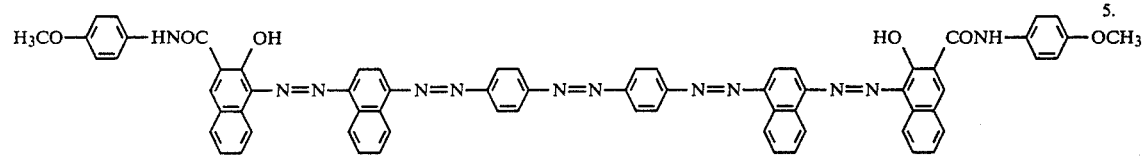
5.
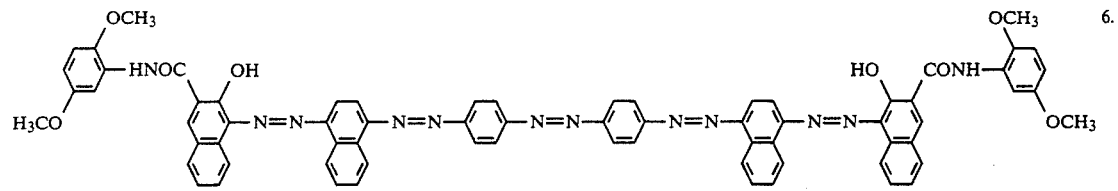
6.
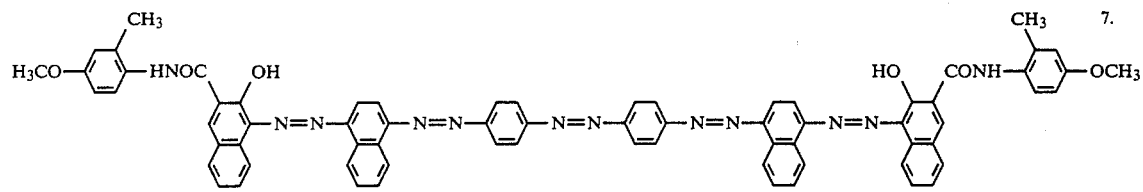
7.
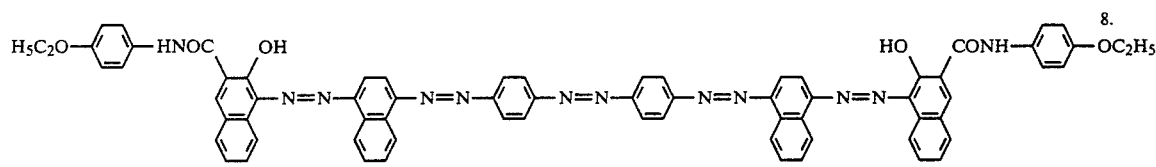
8.
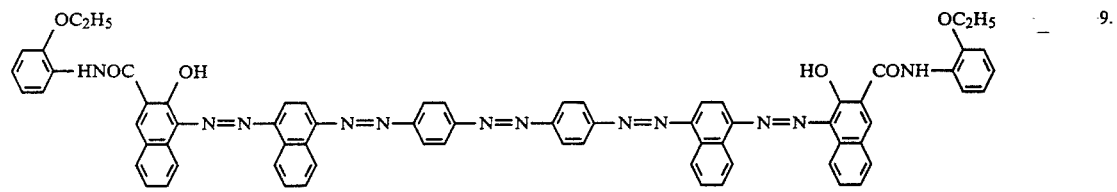
9.
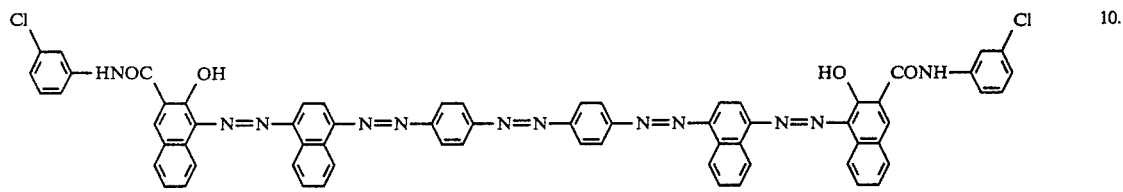
10.
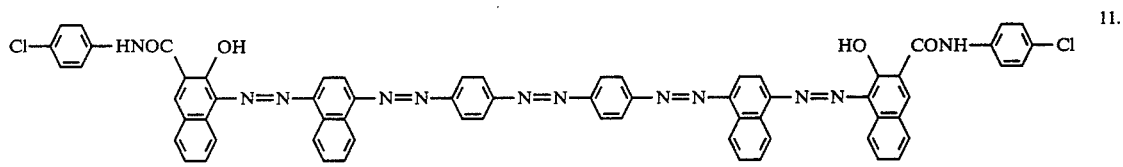
11.
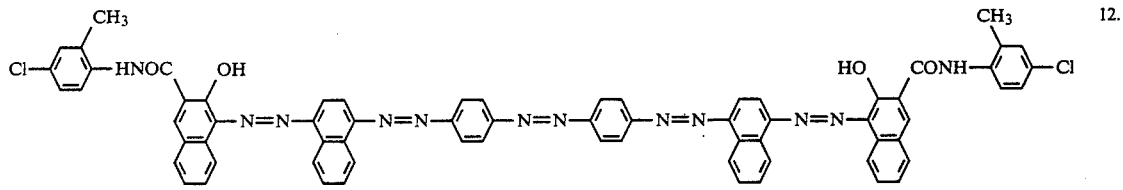
12.
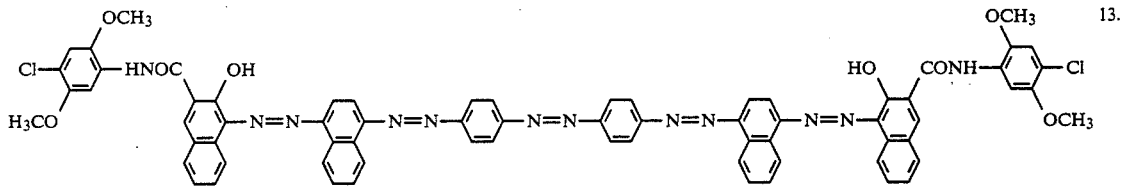
13.

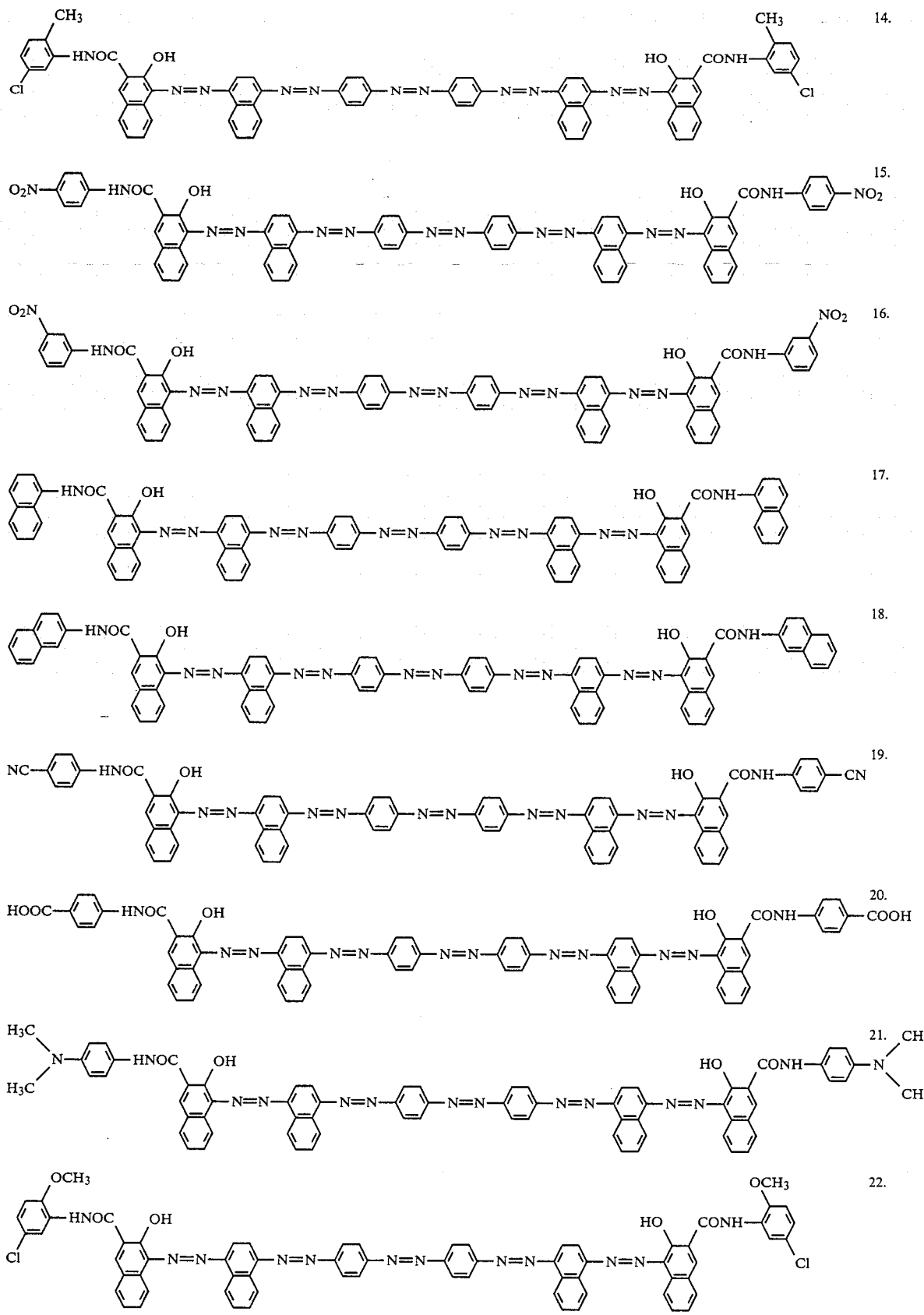

23.
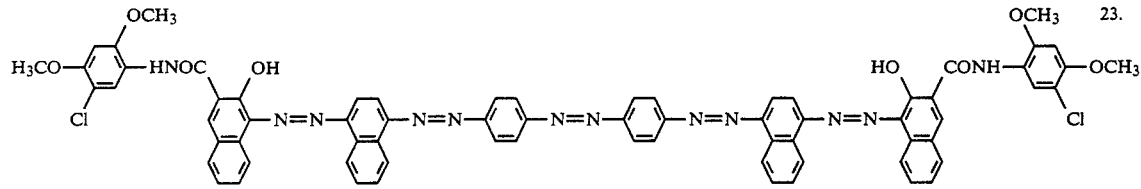
24.
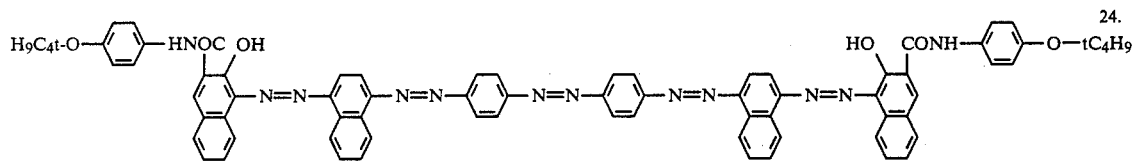
25.
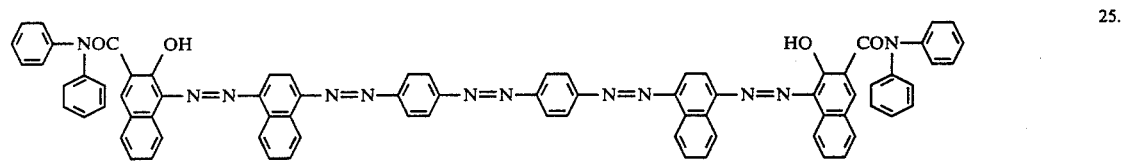
26.
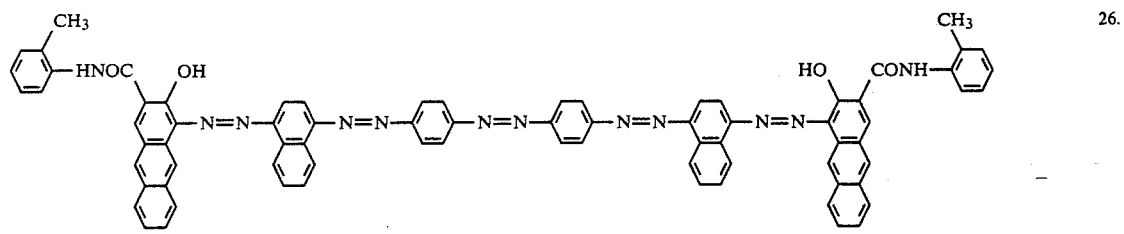
27.
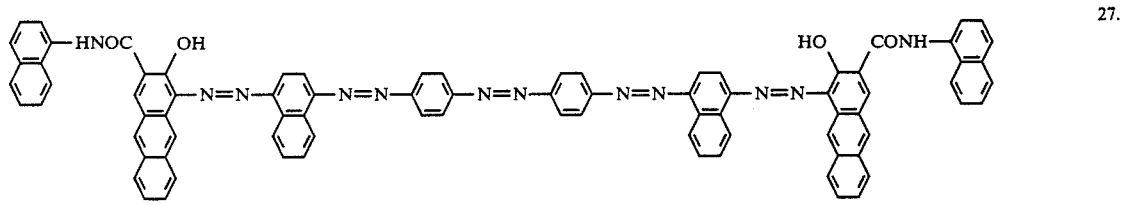
28.
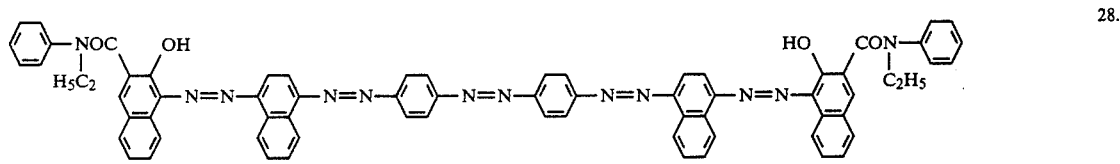
29.
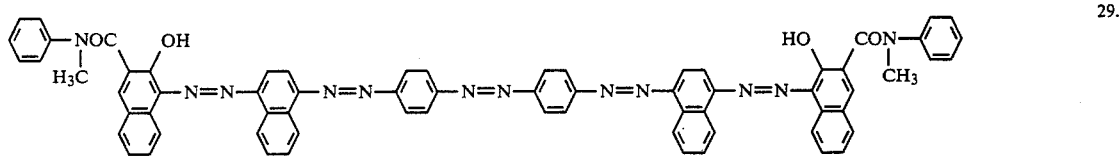
30.
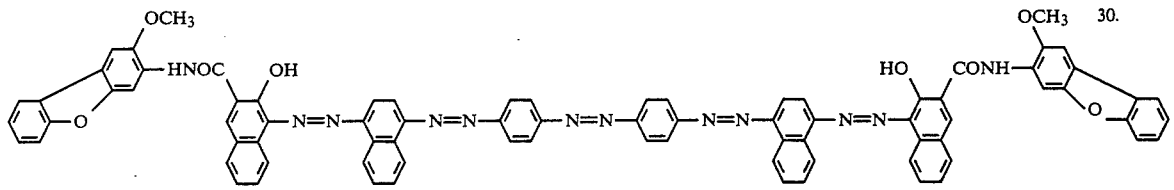

-continued
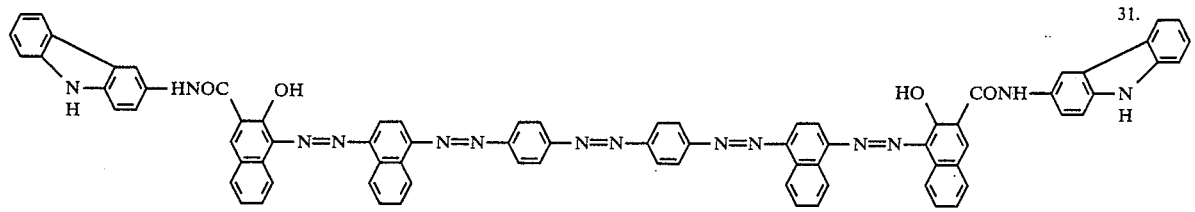
31.
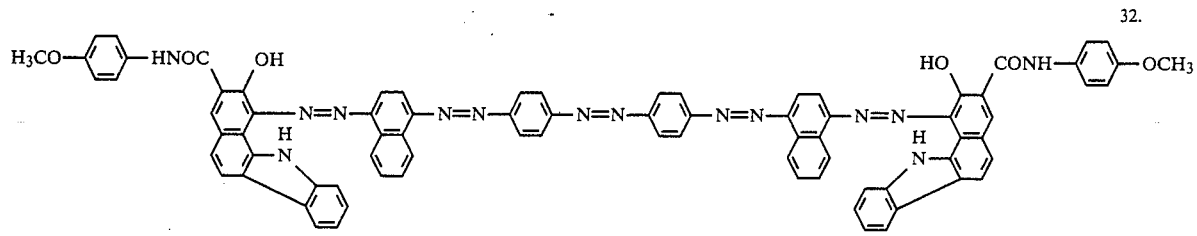
32.
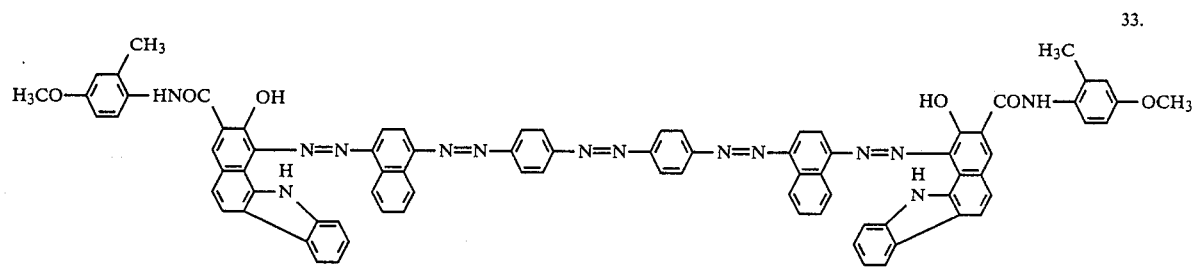
33.
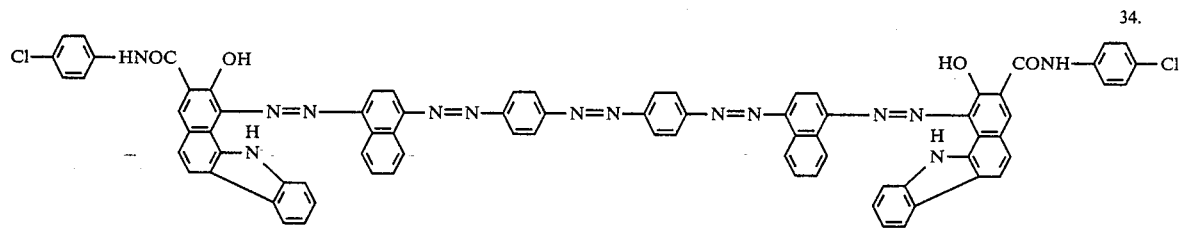
34.
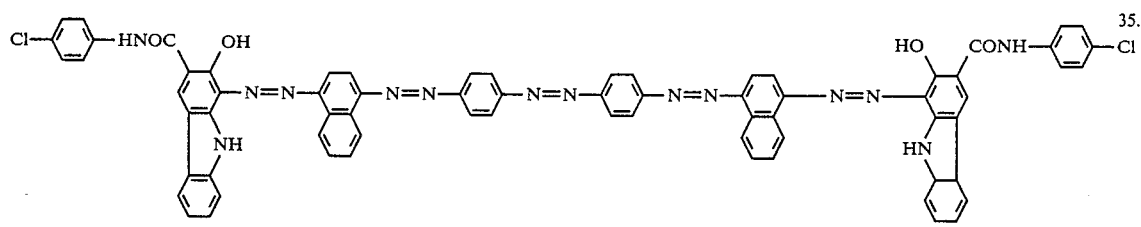
35.
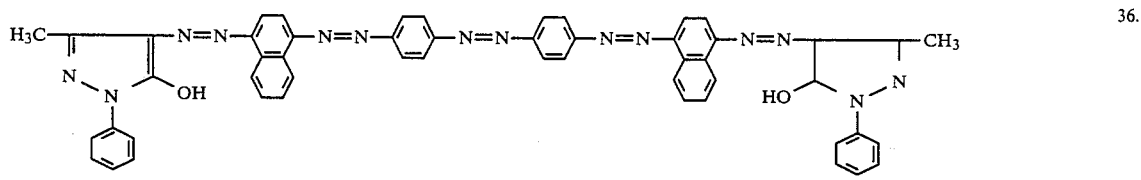
36.
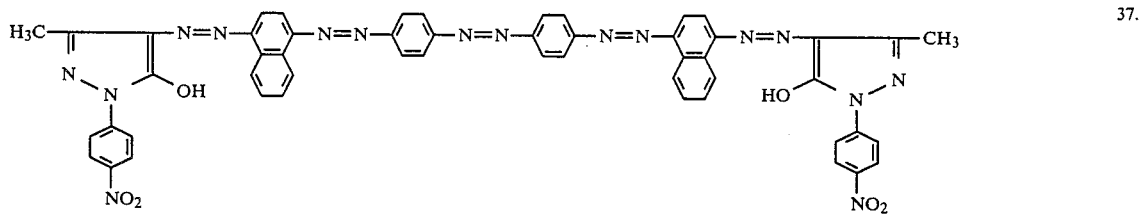
37.

-continued
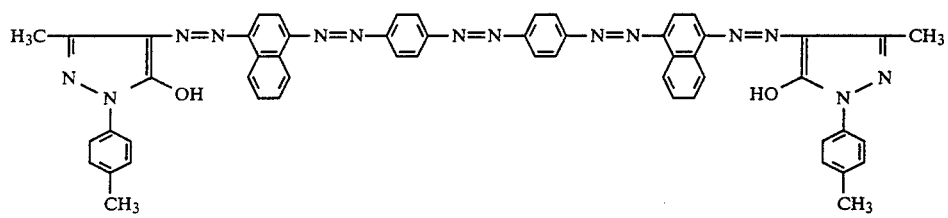
38.
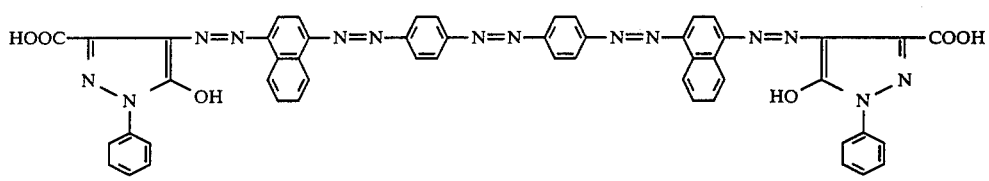
39.
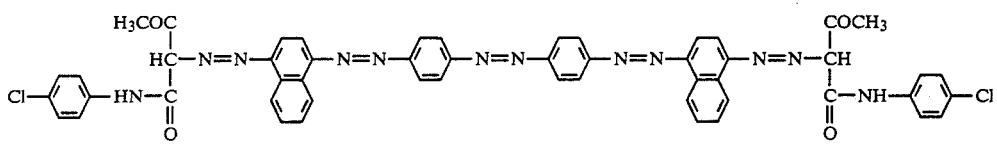
40.
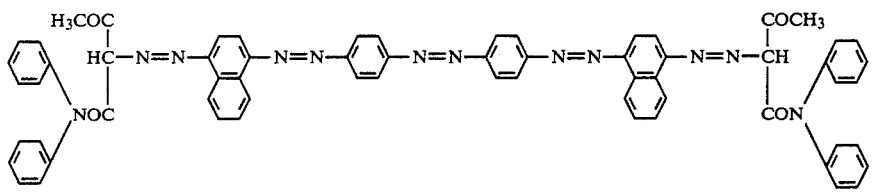
41.
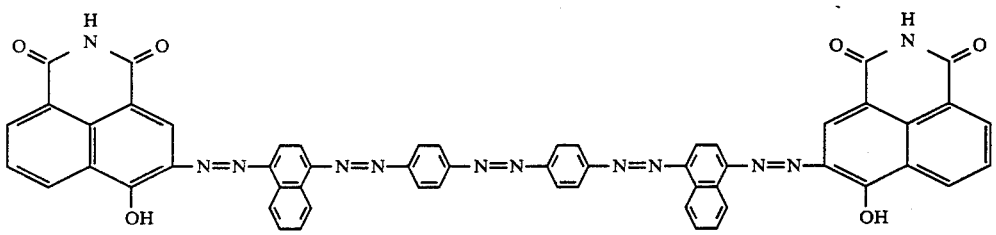
42.
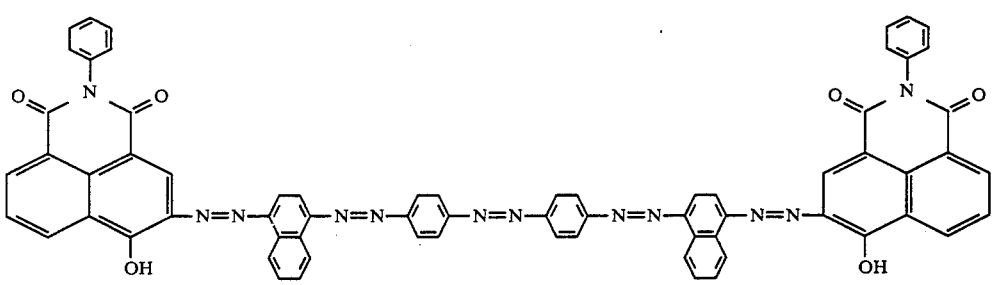
43.
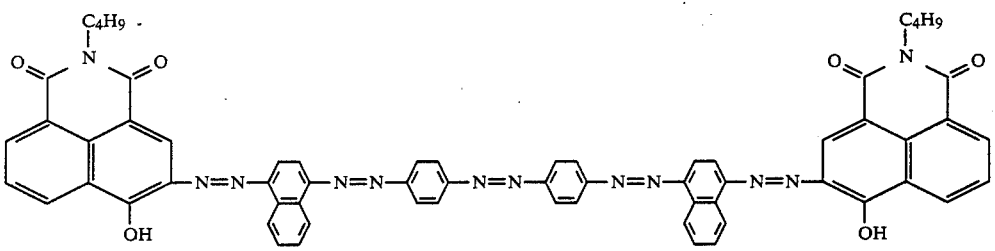
44.

-continued
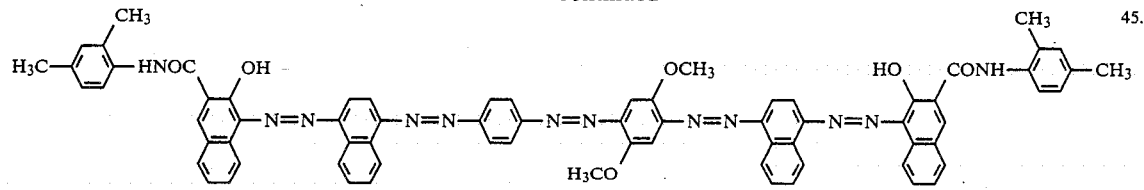 45.
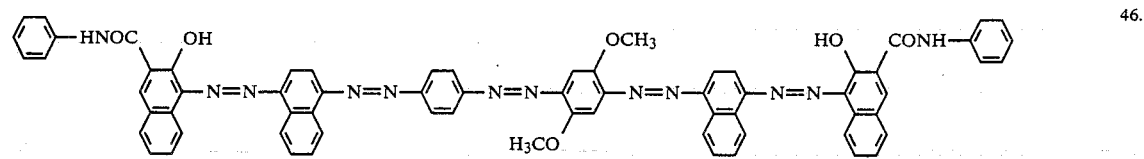 46.
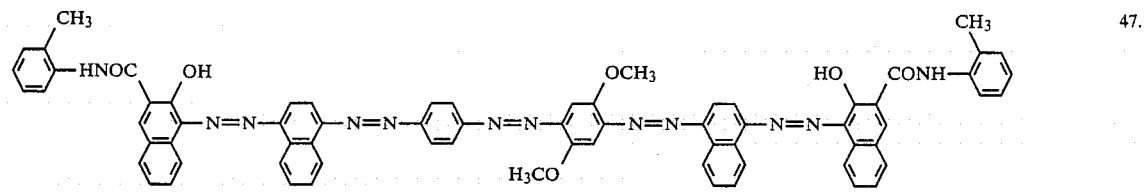 47.
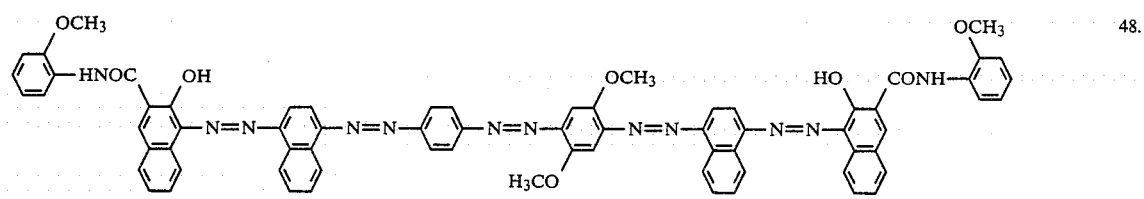 48.
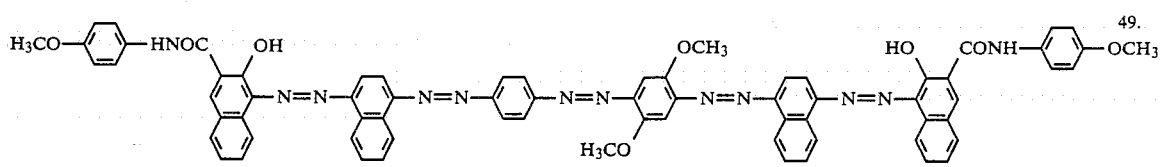 49.
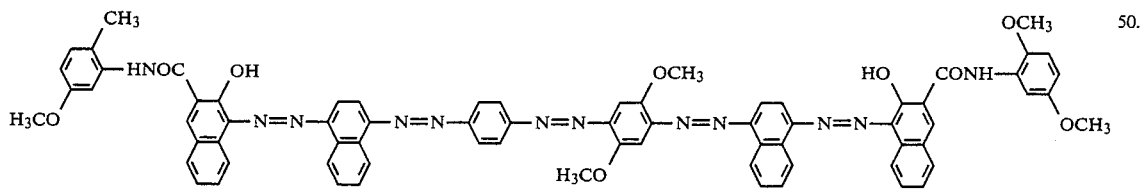 50.
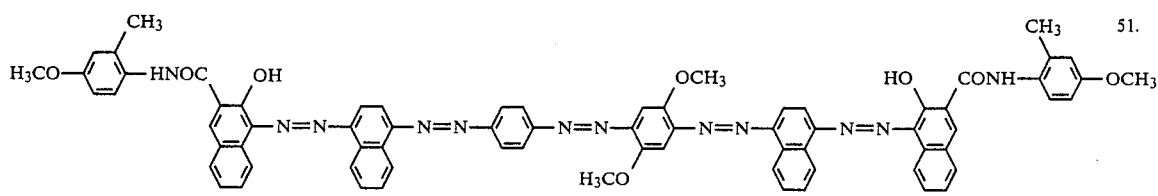 51.
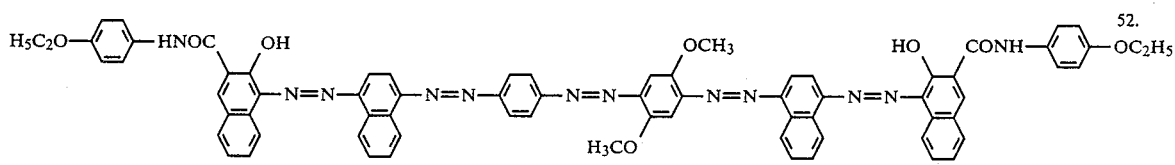 52.

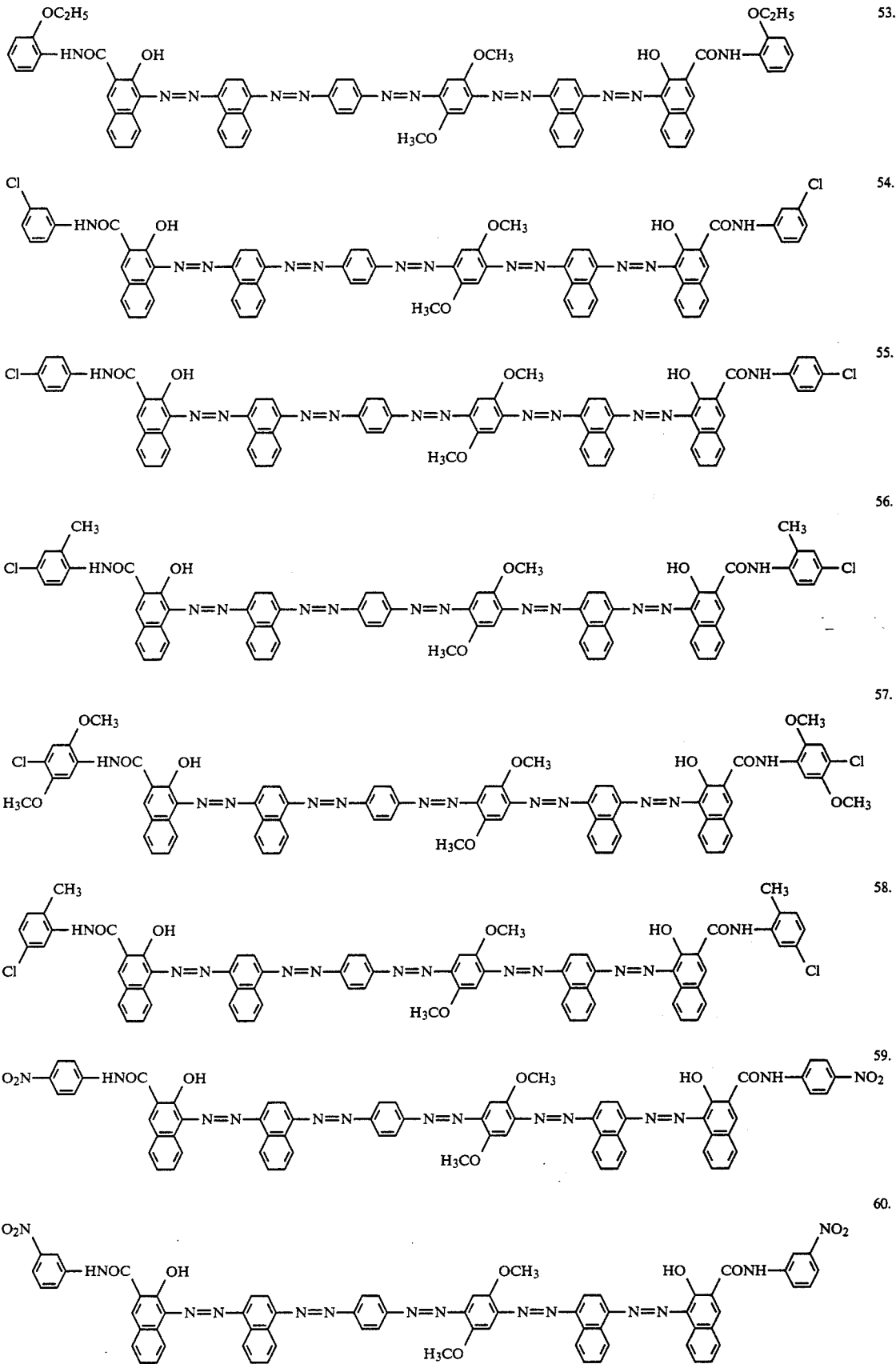

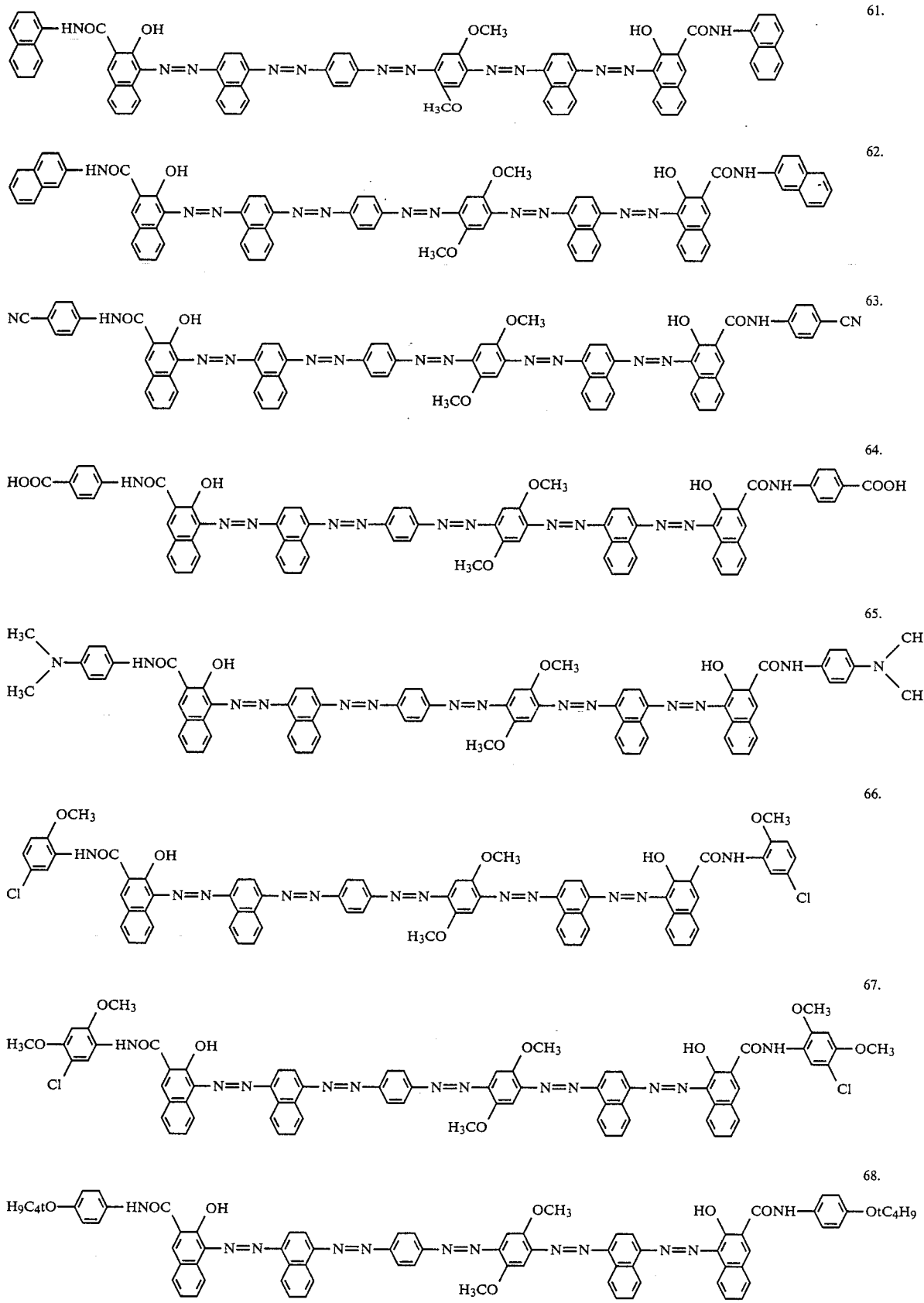

69. 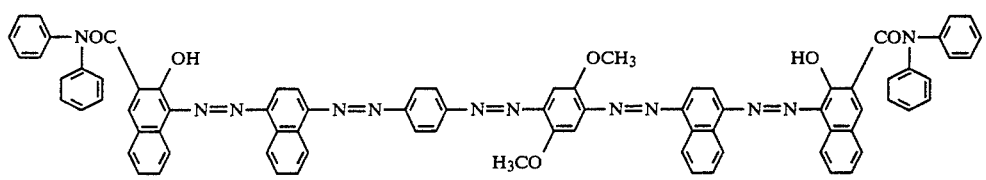
70. 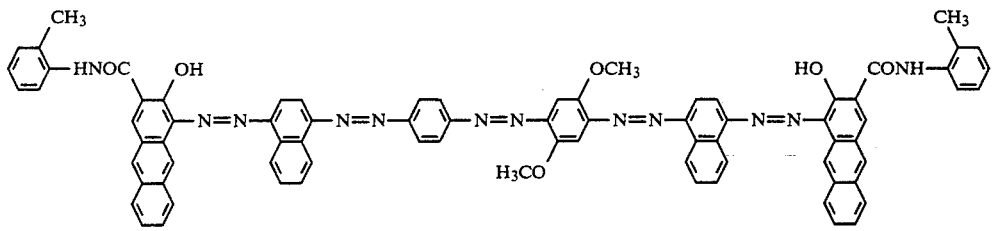
71. 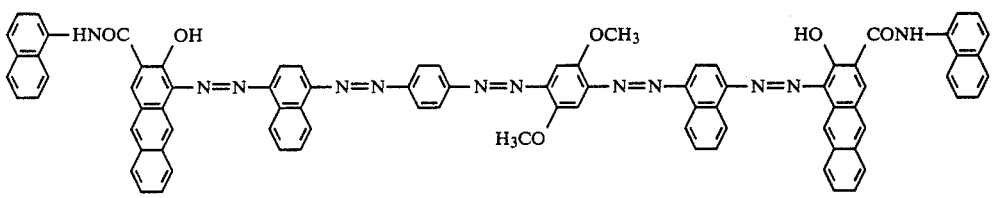
72. 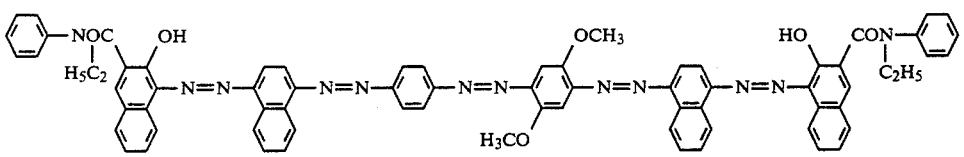
73. 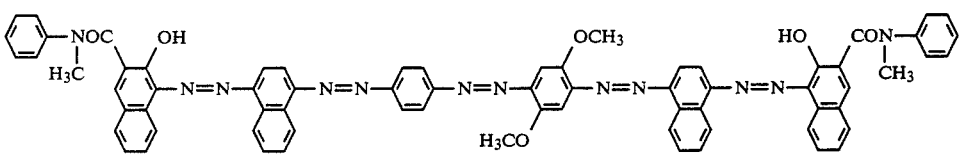
74. 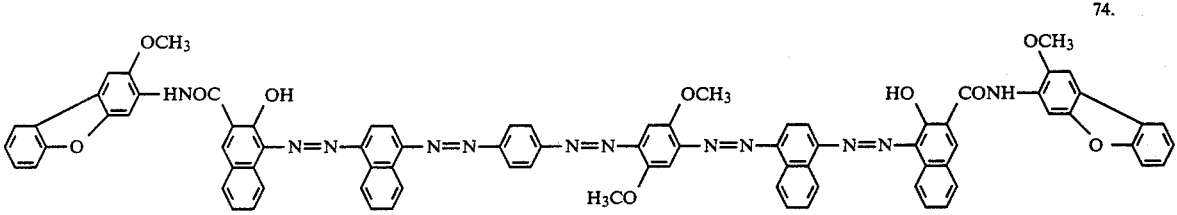
75. 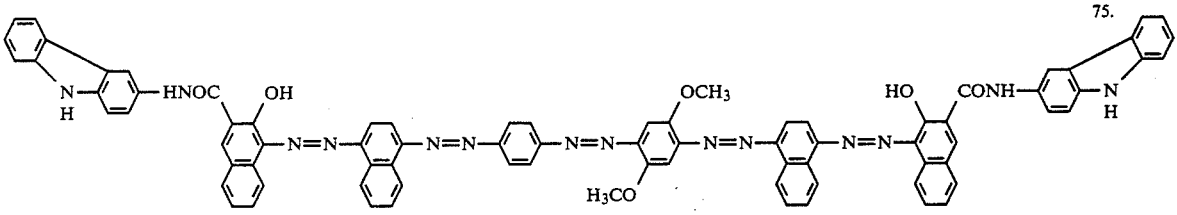
76. 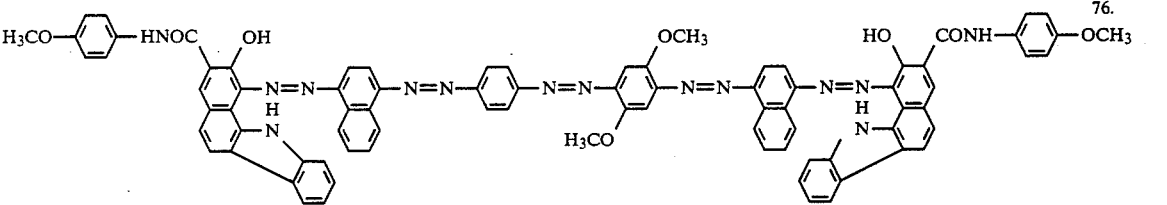

-continued
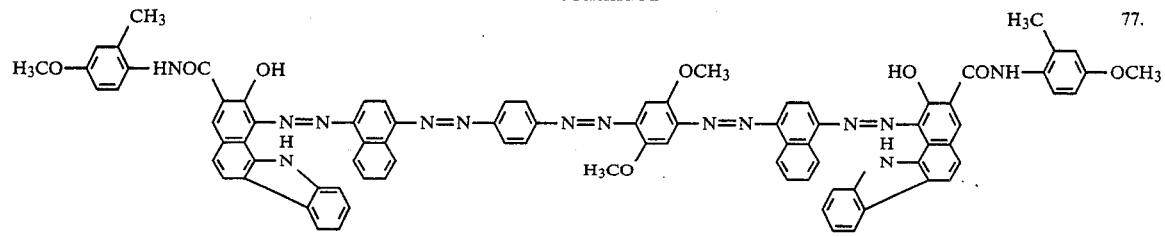
77.
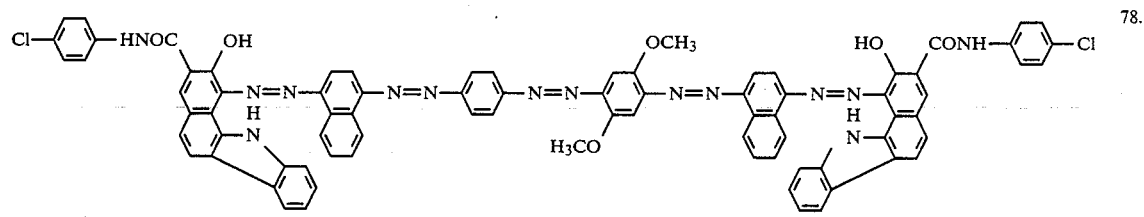
78.
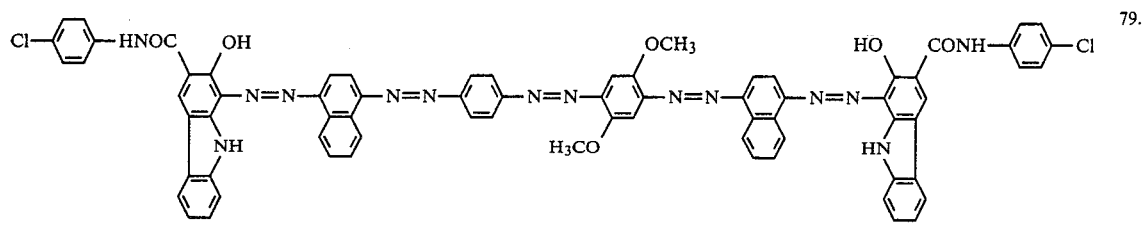
79.
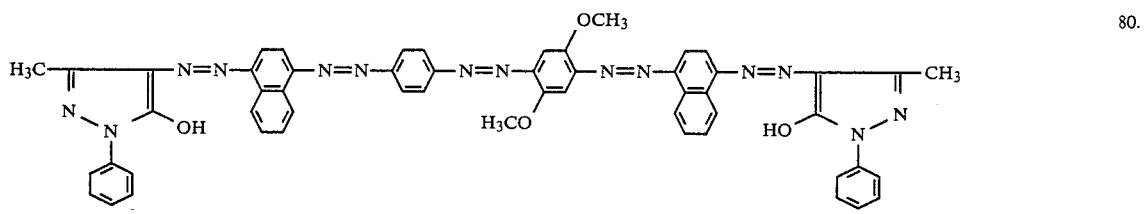
80.
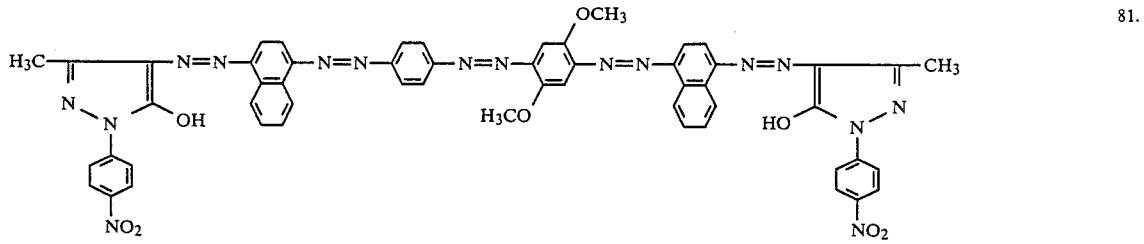
81.
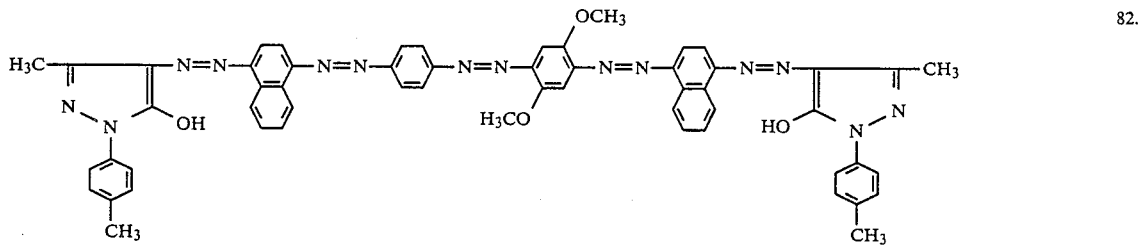
82.
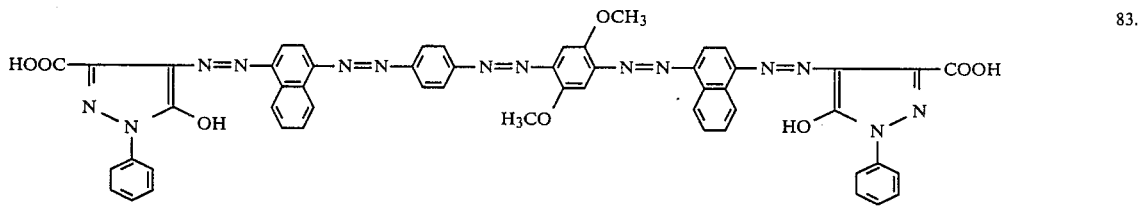
83.

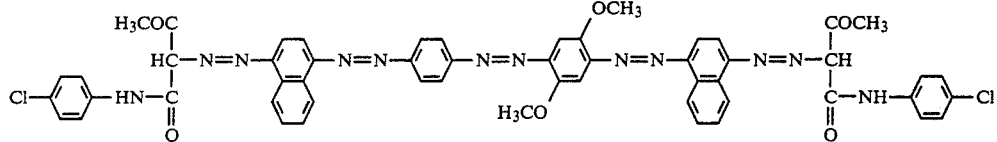
84.
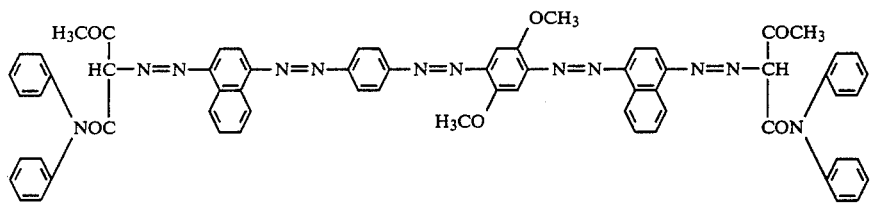
85.
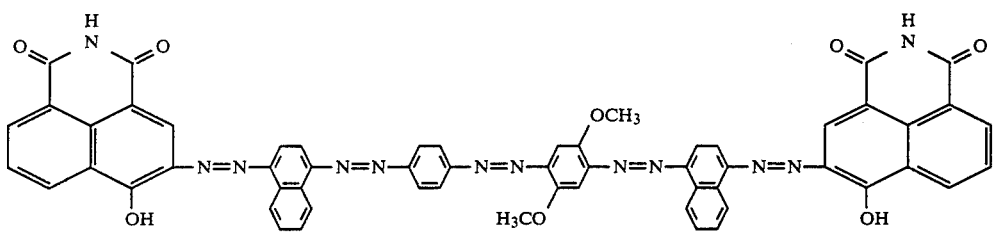
86.
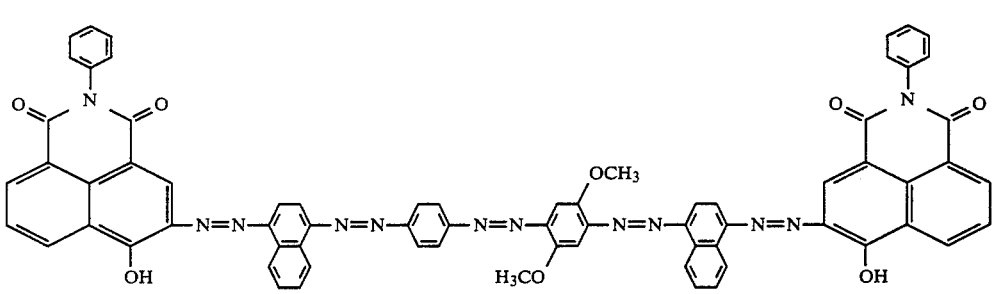
87.
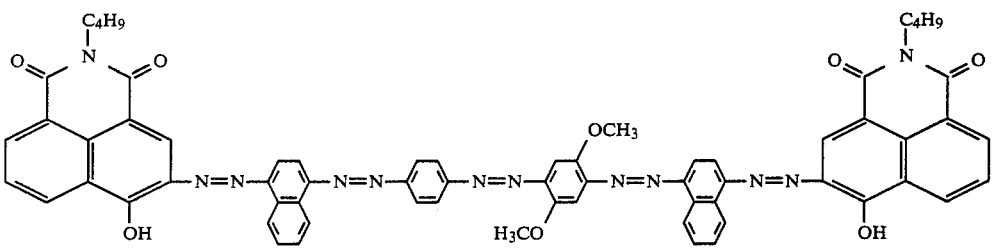
88.
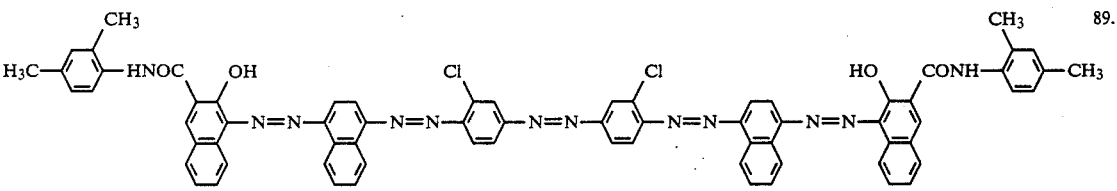
89.
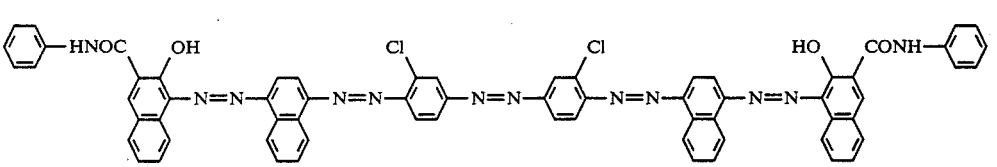
90.

91. 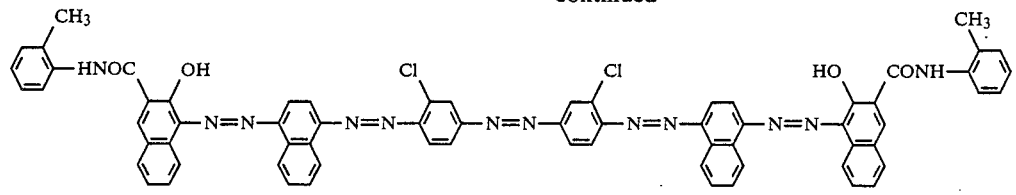
92. 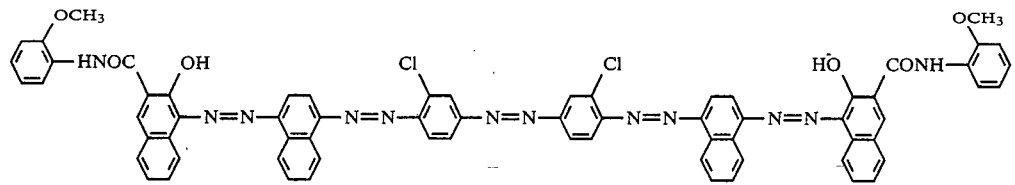
93. 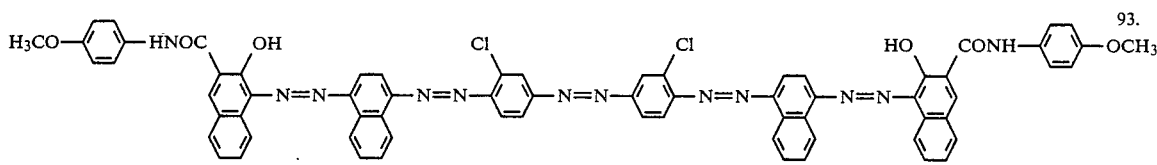
94. 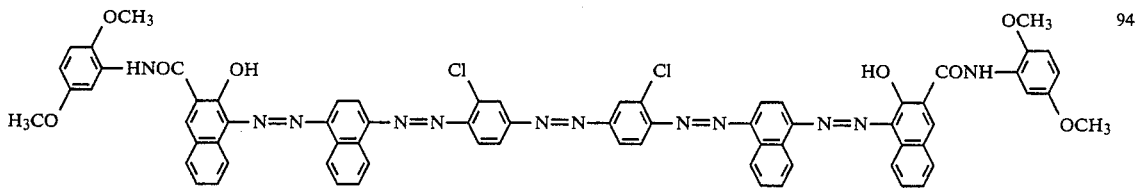
95. 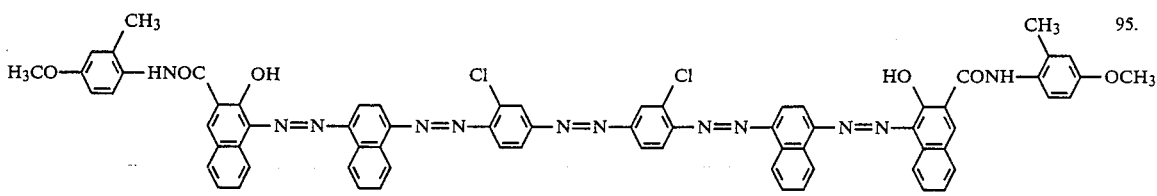
96. 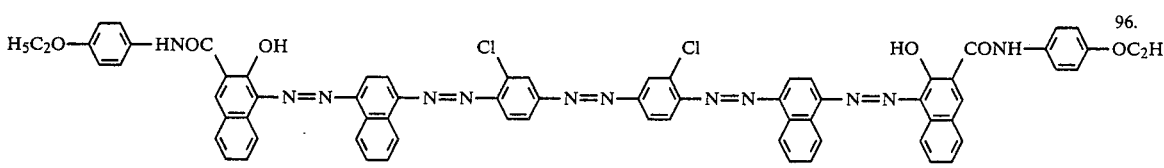
97. 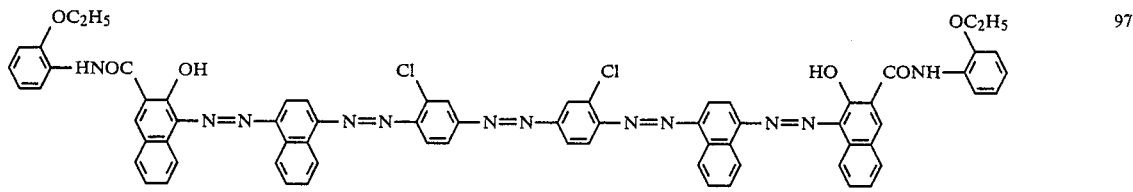
98. 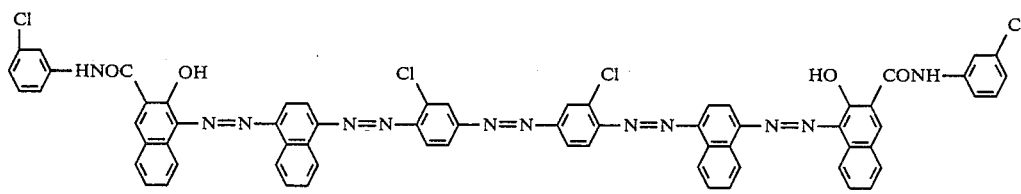
99. 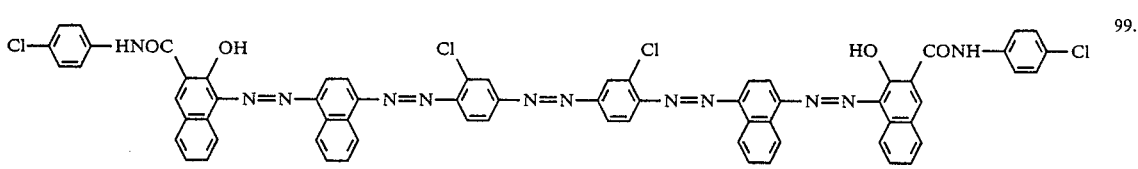

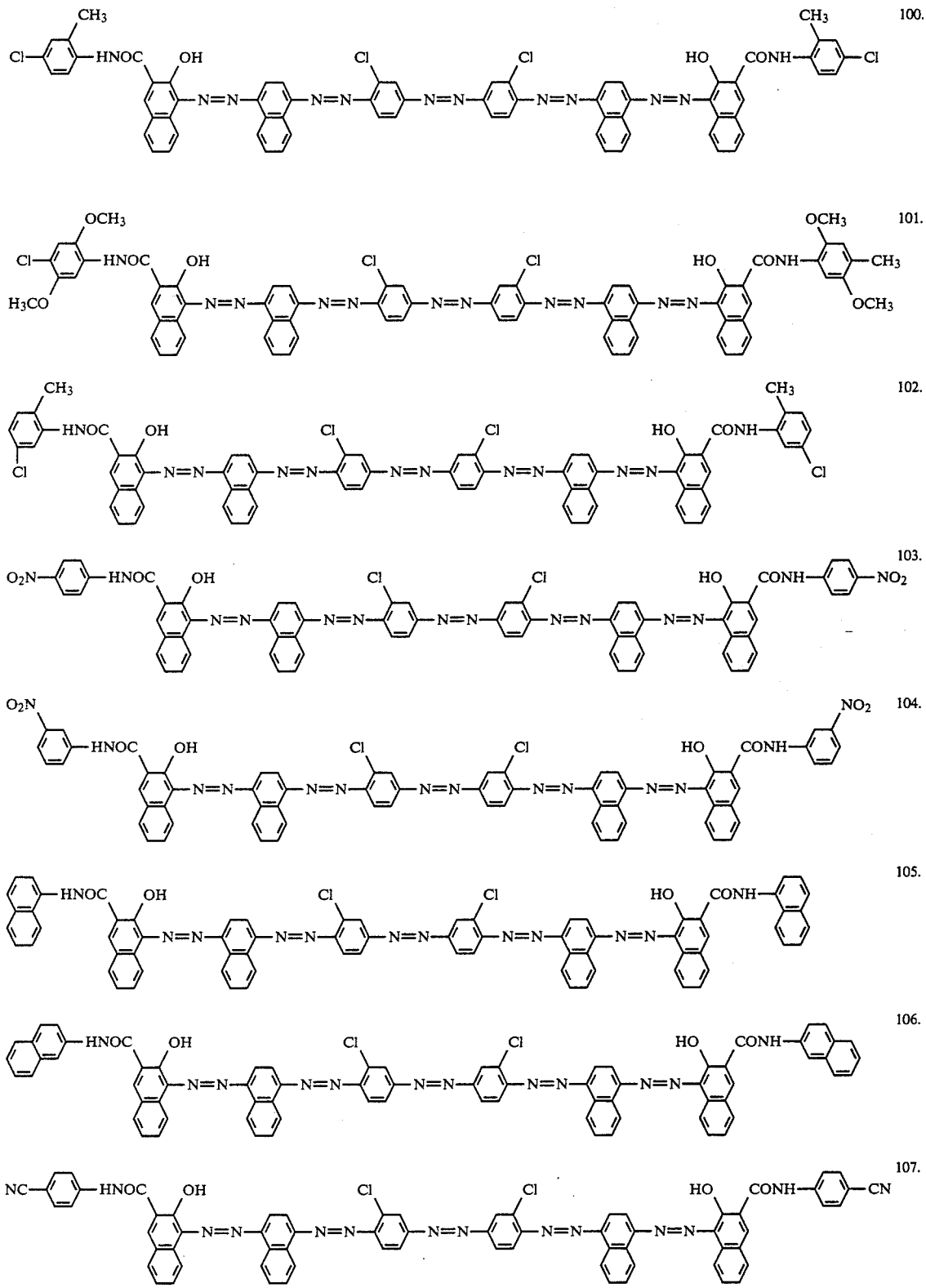

-continued
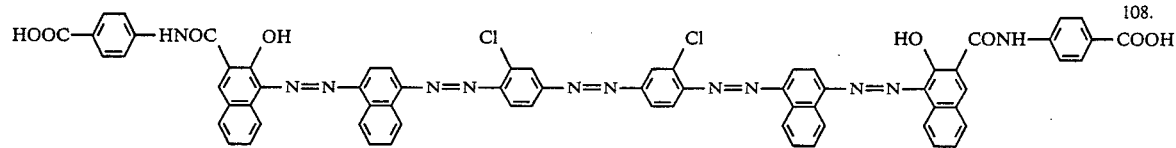
108.
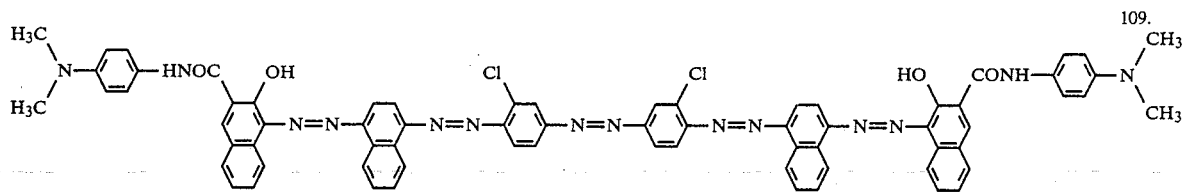
109.
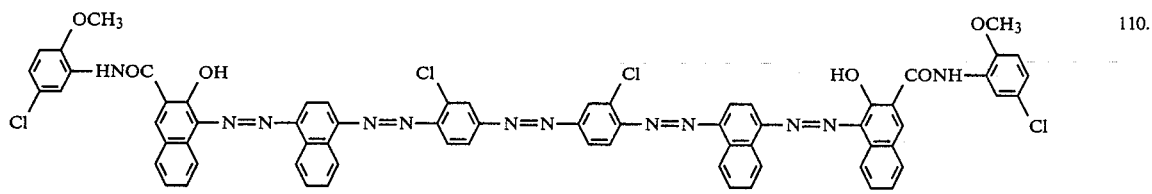
110.
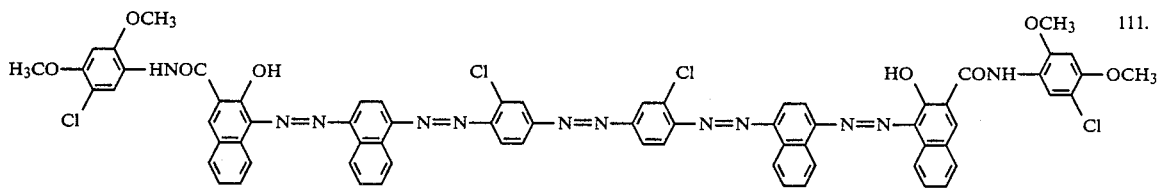
111.
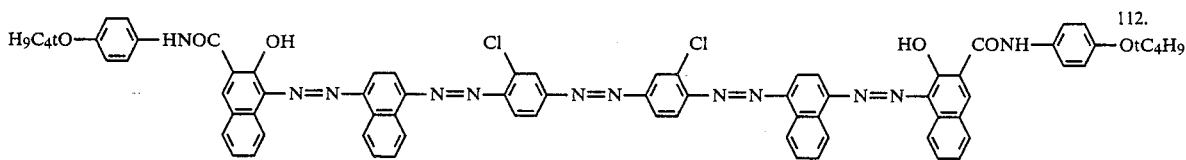
112.
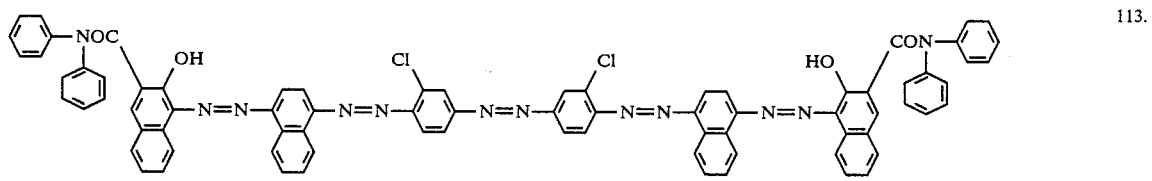
113.
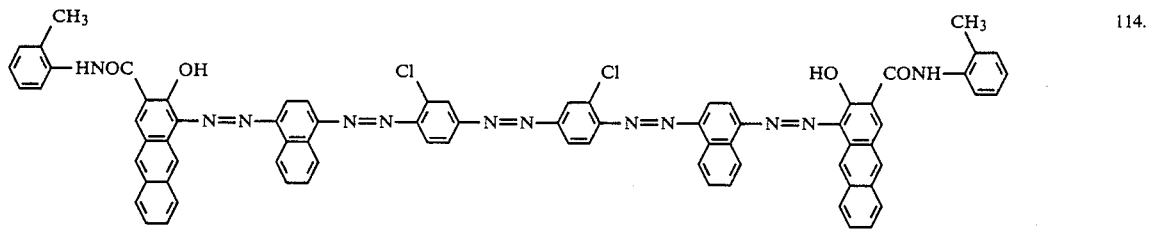
114.
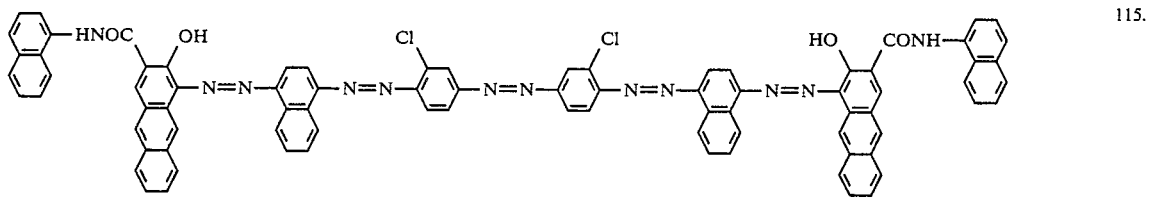
115.

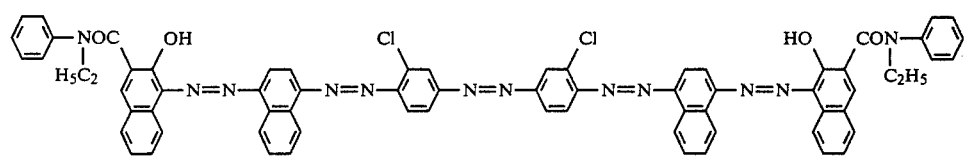
116.
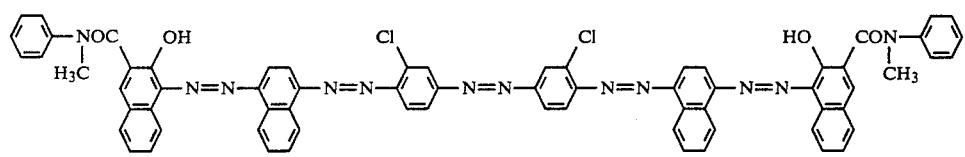
117.
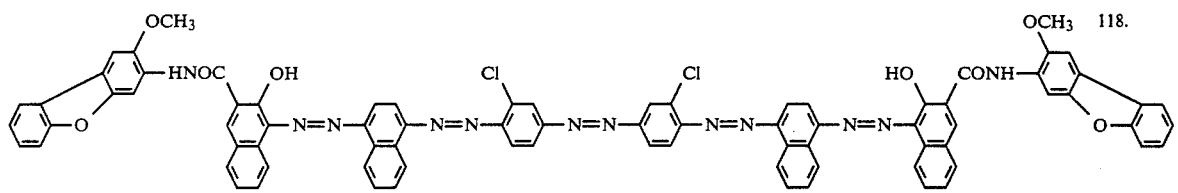
118.
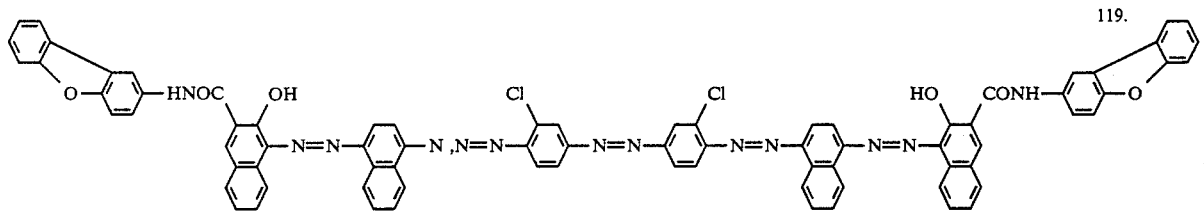
119.
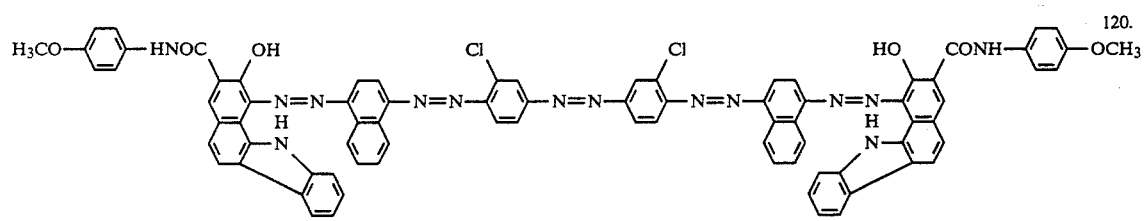
120.
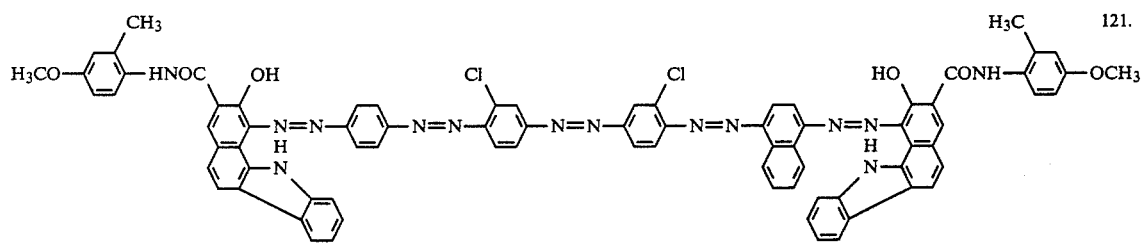
121.
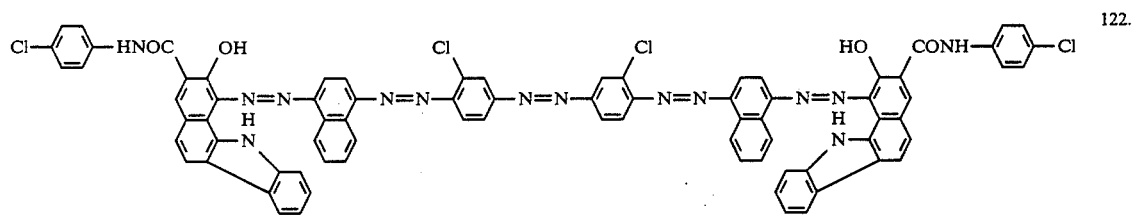
122.
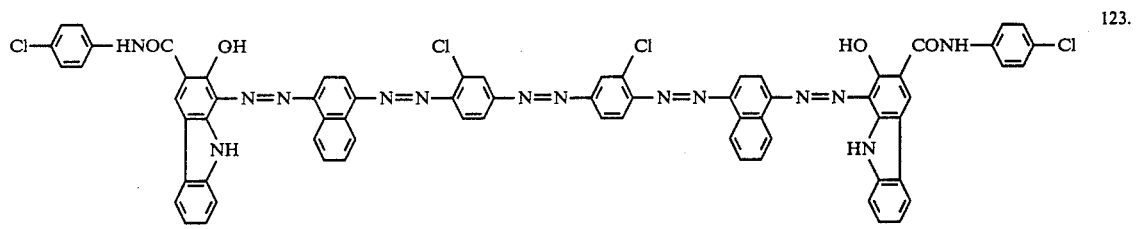
123.

-continued
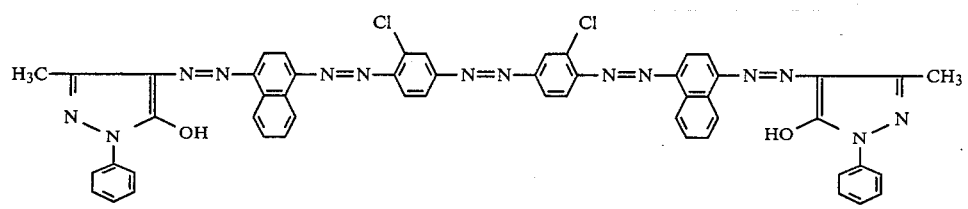
124.
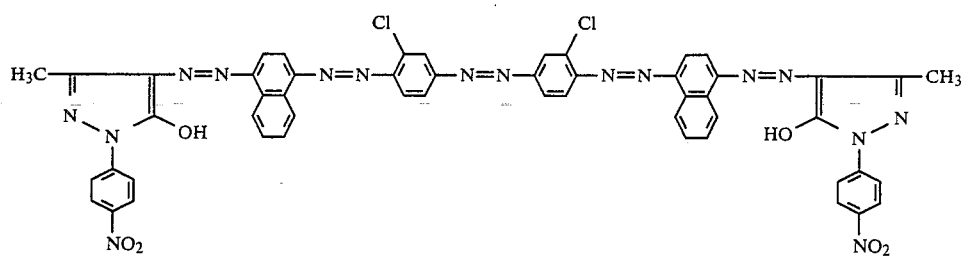
125.
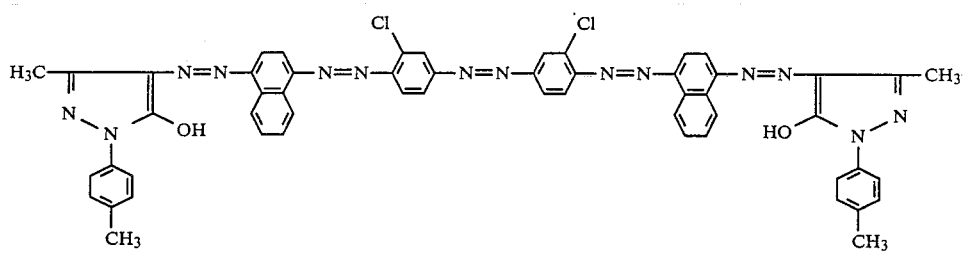
126.
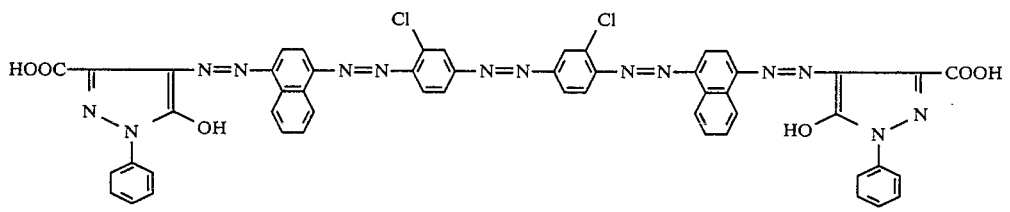
127.
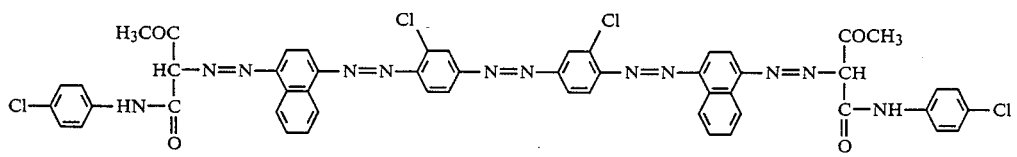
128.
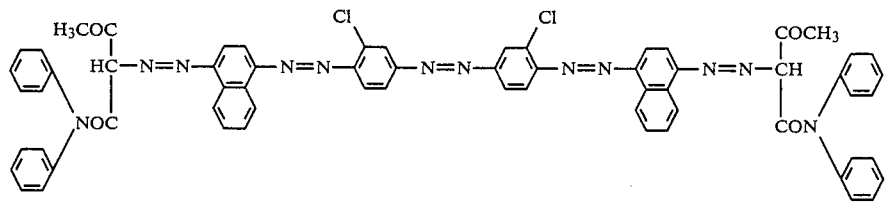
129.
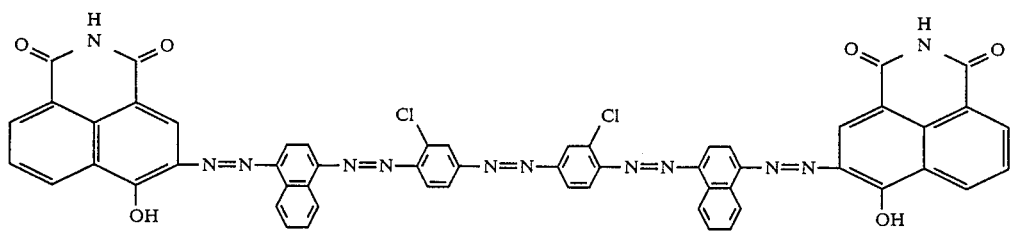
130.

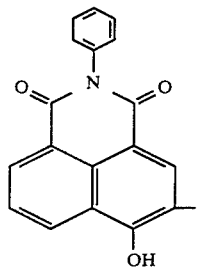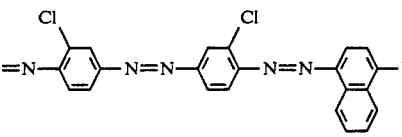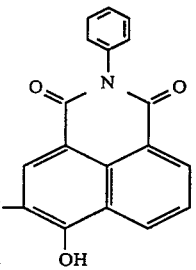
131.
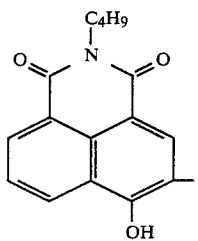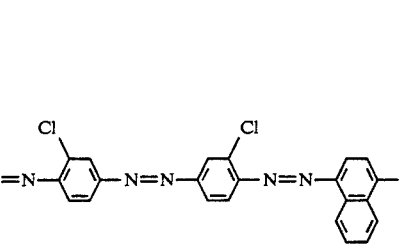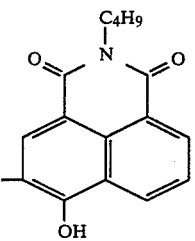
132.
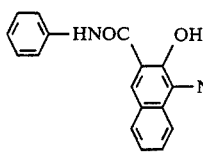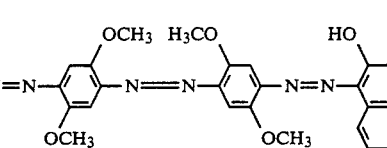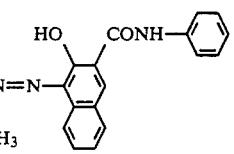
133.
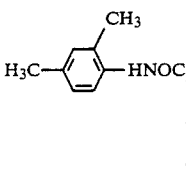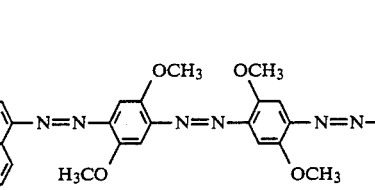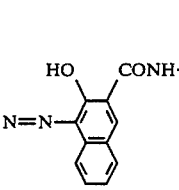
134.
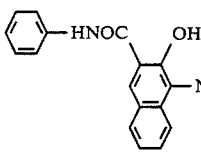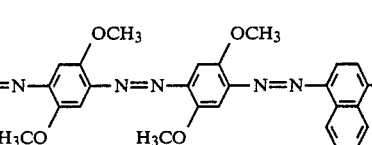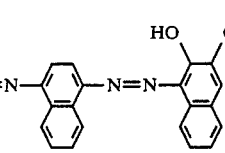
135.
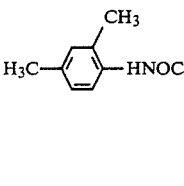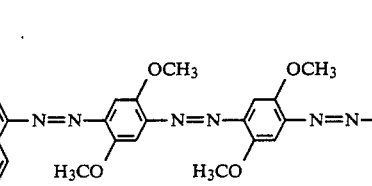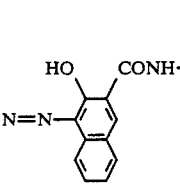
136.
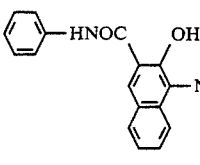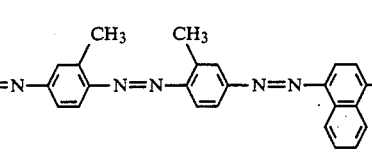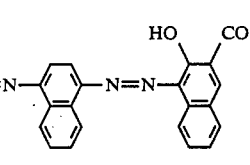
137.
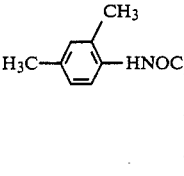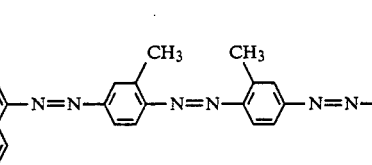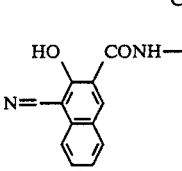
138.

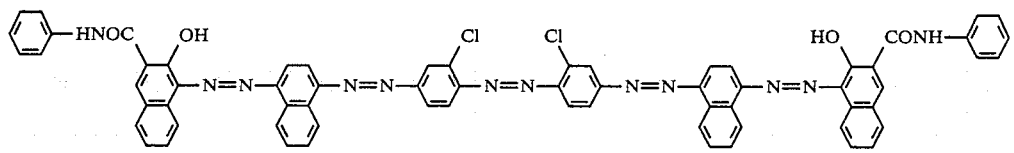
139.

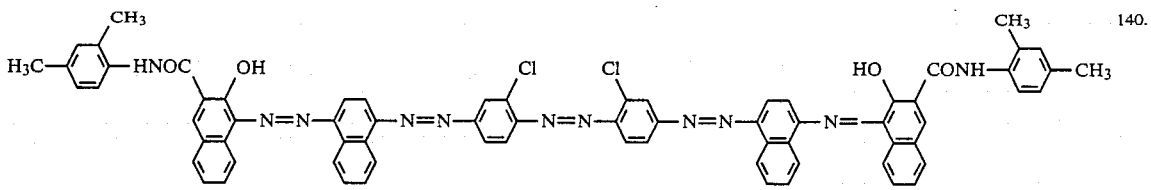
140.

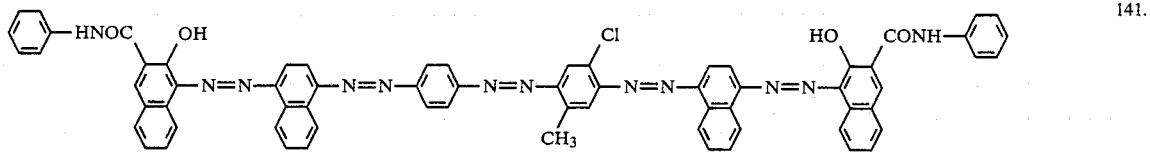
141.

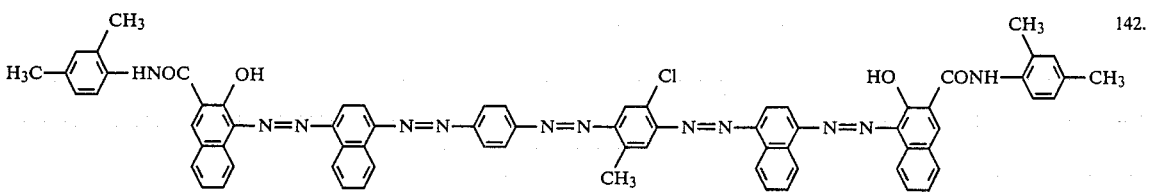
142.

EXAMPLE 1

In a ball mill, 1 part by weight of pentakisazo pigment No. 1 (all of "parts" given hereinafter are by weight), 7 parts of p-diethylaminobenzaldehydo-(diphenylhydrazone), 10 parts of a phenoxy resin (PKHH supplied by Union Carbide Corporation, USA) and 100 parts of tetrahydrofuran (hereinafter referred to as "THF") were dispersed and mixed for 5 hours, and the dispersion was coated on an aluminum foil having a thickness of 50 μ by a wire bar and dried at 80° C. for 1 hour to form an electrophotographic photosensitive material having a photosensitive layer thickness of about 10 μ.

The surface of the photosensitive material was subjected to positive or negative corona discharge at 6 KV by using a commercially available surface voltage meter (Model SP-428 supplied by Kawaguchi Denki). The surface voltage at that time was designated as the initial voltage Vo. The sample was irradiated with light so that the illuminance of the sample surface was 20 luxes. The time required for Vo to be reduced to 1/2 was designated as the half-value time t, and the photosensitivity was evaluated based on the half-value exposure quantity (E1/2, unit=lux.sec) expressed by the formula of E1/2=(illuminance) x (half-value time t).

It was found that in the so-obtained photosensitive material, the initial voltage Vo was +330 V and the half-value exposure quantity E1/2 was 22 lux.sec.

EXAMPLE 2

The test was carried out in the same manner as described in Example 1 except that pentakisazo pigment No. 45, 89, 134, 136, 138, 140 or 142 was used instead of pentakisazo pigment No. 1. The obtained results are shown in Table 1.

TABLE 1

| Pigment No. | Vo | E½ |
|---|---|---|
| 45 | +282 | 26 |
| 89 | +342 | 18 |
| 134 | +360 | 33 |
| 136 | +298 | 16 |
| 138 | +310 | 20 |
| 140 | +336 | 19 |
| 142 | +383 | 17 |

EXAMPLE 3

In a ball mill, 5 parts of pentakisazo pigment No. 3, 15 parts of a polyester resin (Vylon 200 supplied by Toyobo) and 150 parts of THF were dispersed and mixed for 5 hours. The dispersion was coated on an aluminum foil having a thickness 50 μ by wire bar and dried at 100° C. for 30 minutes to obtain an electrophotographic photosensitive material having a photosensitive layer thickness of about 10 μ.

The photosensitive material was stored in the dark, and it was then charged by positive corona discharge and piled closely to a positive original (a transparent film having an image formed thereon). The assembly was exposed to light for 1 second so that the illuminance of the surface of the photosensitive material was 80 luxes, and development was carried out by using a negative two-component type developer (developer for DC-161 supplied by Mita Industrial Co., Ltd.). The developed image was transferred on a plain paper (bond paper having a thickness of about 90 μ) and heat-fixed to obtain a copy faithful to the original, which had a high contrast with no fogging.

EXAMPLE 4

The test was carried out in the same manner as described in Example 3 except that pentakisazo pigment No. 7, 47, 51, 91 or 95 was used instead of pentakisazo pigment No. 3. In each case, a copy faithful to the original was obtained without fogging.

EXAMPLE 5

In a ball mill, 1 part of pentakisazo pigment No. 1 was dispersed and mixed into 20 parts of THF for 5 hours, and the dispersion was coated on an aluminum foil having a thickness of 50 $\mu$ by a wire bar and dried at 100° C. for 30 minutes to form a charge generating layer having a thickness of 1 $\mu$. A mixed solution comprising 5 parts of p-diethylaminobenzaldehydo(diphenylhydrazone), 5 parts of a polyester resin and 50 parts of THF was coated on the charge generating layer and dried at 80° C. for 1 hour to form a charge transport layer having a thickness of about 10 $\mu$.

When the photographic characteristics of the so-obtained laminated photosensitive material were measured, it was found that Vo was −840 V and E1/2 was about 7.5 lux·sec.

The spectral sensitivity of the laminated photosensitive material was measured in the following manner.

The sample was negatively charged by negative corona discharge and the sample was exposed to a constant-energy monochromatic light so that the light receiving intensity on the sample surface was 3.7 $\mu$w/cm$^2$. The reciprocal number of the time T (half-value time) required for the surface voltage to be reduced to $\frac{1}{2}$ was obtained with respect to each wavelength and was plotted to obtain a spectral sensitivity curve shown in FIG. 1.

A spectrograph Model SS-50 supplied by Nippon Bunko was used as the spectrograph for putting out the constant-energy monochromatic light.

From FIG. 1, it is seen that the photosensitive material had a spectral sensitivity even to rays in the near infrared region and infrared region.

EXAMPLE 6

Figure 2:
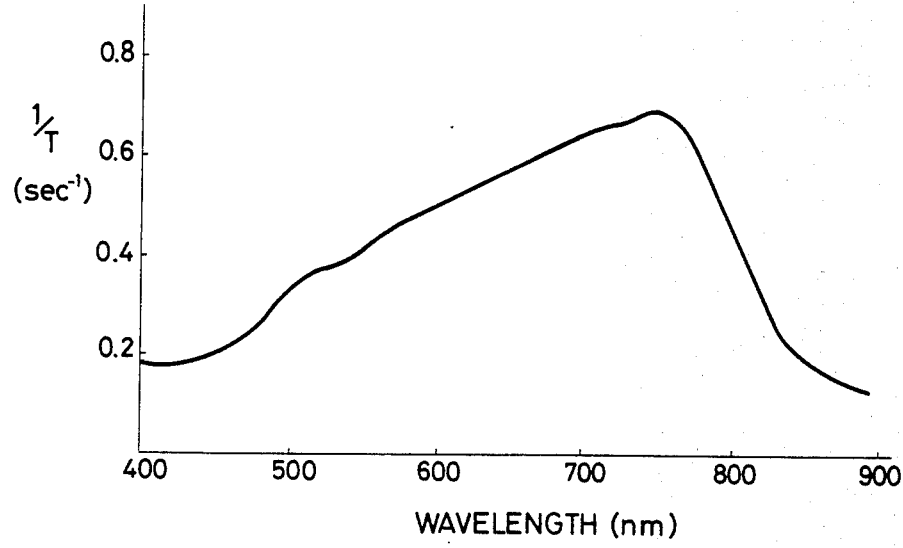
FIG. 2 is a diagram illustrating the spectral sensitivity of a laminated photosensitive material comprising pentakisazo pigment No. 45 according to the present invention.

The test was carried out in the same manner as described in Example 5 except that pentakisazo pigment No. 45 was used instead of pentakisazo pigment No. 1. It was found that Vo was −622 V and E1/2 was 8.0 lux·sec. The spectral sensitivity curve obtained was as shown in FIG. 2.

EXAMPLE 7

Laminated photosensitive materials were prepared in the same manner as described in Example 5 except that pentakisazo pigments shown in Table 2 were used instead of pentakisazo pigment No. 1, and the laminated photosensitive materials were tested in the same manner as described in Example 5 to obtain results shown in Table 2.

TABLE 2

| Azo pigment No. | Vo | E$\frac{1}{2}$ |
|---|---|---|
| 2 | −510 | 17.6 |
| 6 | −560 | 18.1 |
| 11 | −470 | 15.2 |
| 16 | −620 | 9.3 |
| 17 | −570 | 12.1 |
| 18 | −570 | 17.7 |
| 36 | −610 | 24.3 |
| 44 | −510 | 18.5 |
| 46 | −535 | 11.2 |
| 50 | −560 | 13.3 |
| 55 | −615 | 9.5 |
| 60 | −660 | 6.5 |
| 61 | −534 | 10.0 |

TABLE 2-continued

| Azo pigment No. | Vo | E$\frac{1}{2}$ |
|---|---|---|
| 62 | −616 | 9.8 |
| 80 | −588 | 23.7 |
| 88 | −611 | 14.1 |
| 89 | −703 | 6.1 |
| 90 | −656 | 7.2 |
| 94 | −633 | 10.3 |
| 99 | −658 | 9.7 |
| 104 | −630 | 5.5 |
| 105 | −671 | 8.8 |
| 106 | −685 | 9.3 |
| 124 | −616 | 23.0 |
| 132 | −705 | 11.8 |
| 133 | −583 | 6.8 |
| 134 | −611 | 5.7 |
| 135 | −580 | 7.0 |
| 136 | −606 | 6.1 |
| 137 | −581 | 8.8 |
| 138 | −619 | 6.8 |
| 139 | −652 | 9.3 |
| 140 | −703 | 8.8 |
| 141 | −711 | 6.8 |
| 142 | −731 | 5.6 |

What is claimed is:

1. A photosensitive material for electrophotography, which comprises a photosensitive layer containing as a charge-generating pigment a pentakisazo pigment represented by the following formula:

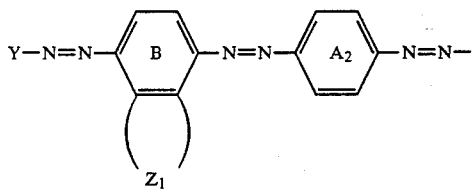

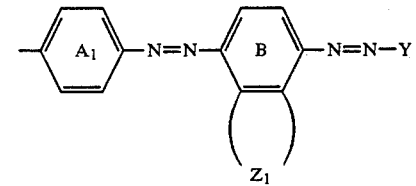

wherein the rings A$_1$ and A$_2$ may have halogen atoms, alkyl groups or alkoxy groups as substitutents at the ortho-positions to the azo groups, the ring B may have a halogen atom, an alkyl group or an alkoxy group as a substituent or may contain the ring Z$_1$, Z$_1$ selected from the group consisting of an aromatic or hetero ring fused to the benzene ring B, or a substituted derivative thereof and Y stands for a group selected from a group represented by the following formula:

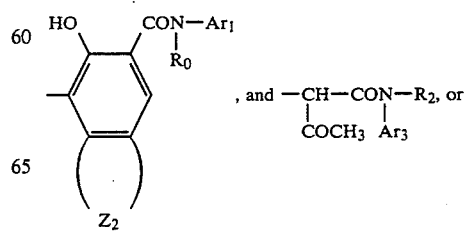

-continued

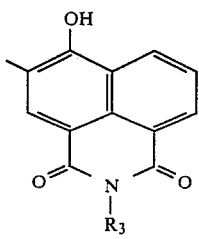

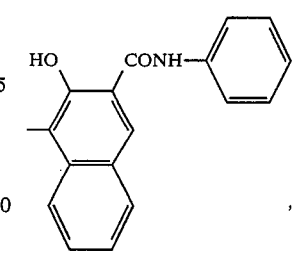

in which $Z_2$ is an aromatic ring, a carbozole ring or a benzofuran ring or a substituted derivative thereof, $Ar_1$ is an aromatic ring, a hetero ring or a substituted derivative thereof, $Ar_2$ and $Ar_3$ is an aromatic ring or a substituted derivative thereof, $R_0$ is a hydrogen atom, a lower alkyl group or a phenyl group, $R_1$ is a lower alkyl group, a carboxyl group or an ester thereof, and $R_2$ and $R_3$ is a hydrogen atom, a lower alkyl group, a phenyl group or a substituted derivative thereof.

2. A photosensitive material as set forth in claim 1, wherein the photosensitive layer is composed of a dispersion of the pentakisazo pigment in an electrically insulating binder medium.

3. A photosensitive material as set forth in claim 2, wherein the pentakisazo pigment is present in an amount of 5 to 100 parts by weight per 100 parts by weight of the binder.

4. A photosensitive material as set forth in claim 1, wherein the photosensitive layer is composed of a dispersion of the pentakisazo pigment as the charge generating pigment in a charge transport substance.

5. A photosensitive material as set forth in claim 4, wherein the pentakisazo pigment is present in an amount of 1 to 30 parts by weight per 100 parts by weight of the whole photosensitive layer.

6. A photosensitive material as set forth in claim 1, wherein the photosensitive layer comprises a charge generating layer containing the pentakisazo pigment formed on an electroconductive substrate and a layer of a charge transport substance formed on the charge generating layer.

7. A photosensitive material as set forth in claim 6, wherein the charge generating layer has a thickness of 0.1 to 3 microns and the charge transport layer has a thickness of 5 to 30 microns.

8. The photosensitive material of claim 1, wherein Y stands for a group represented by the formula:

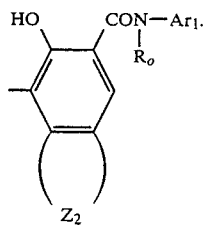

9. The photosensitive material of claim 8, wherein Y is selected from the group consisting of

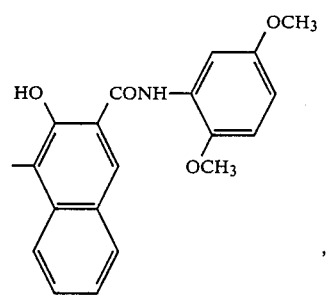

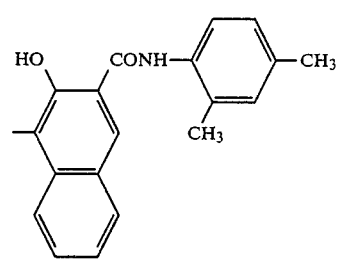

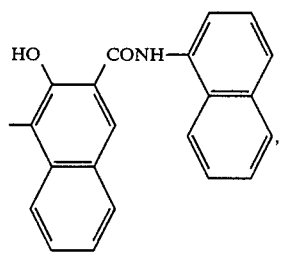

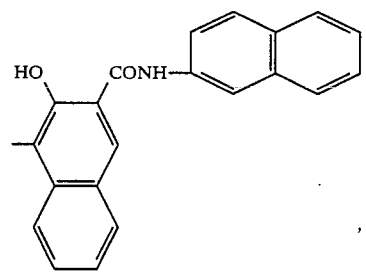

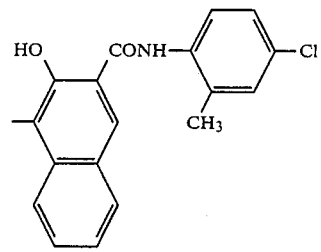

-continued
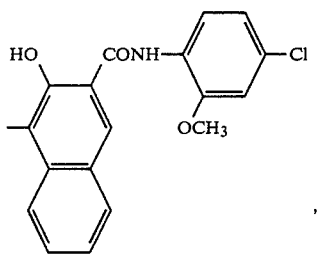
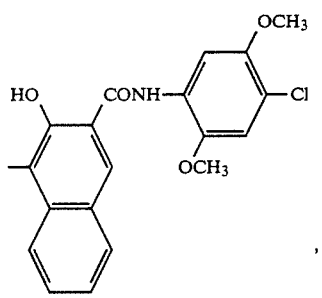
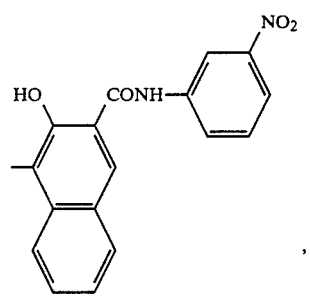
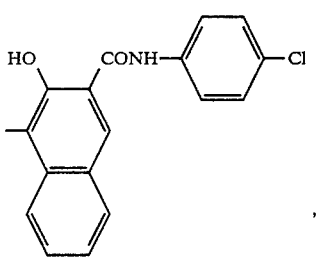
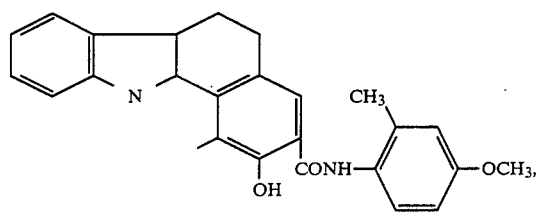
-continued
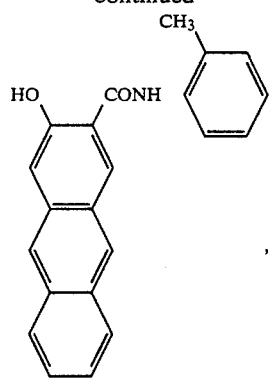
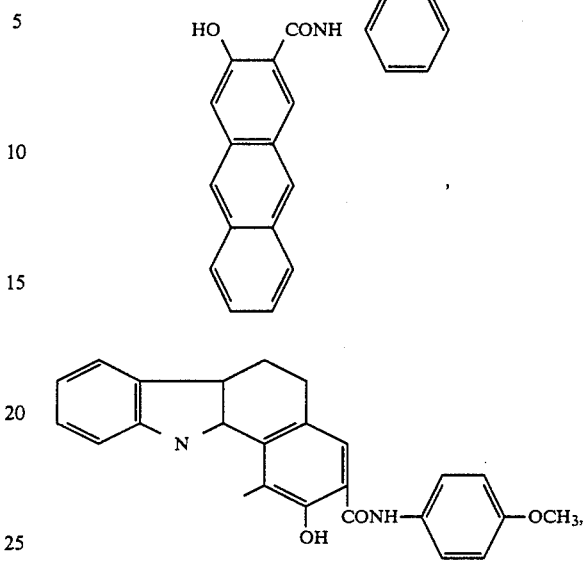
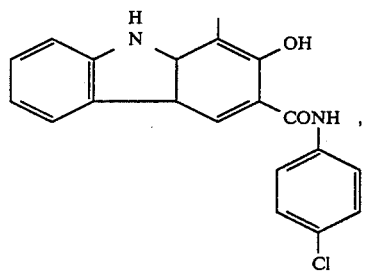
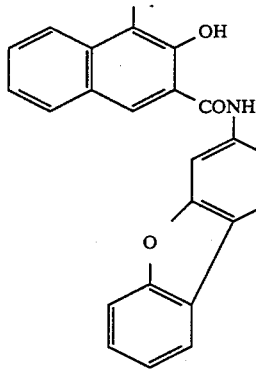
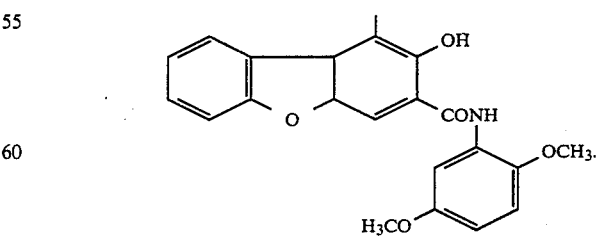
10. The photosensitive material of claim 1, wherein Y is the group represented by the formula

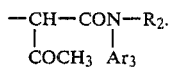

11. The photosensitive material of claim 10, wherein Y is selected from the group consisting of

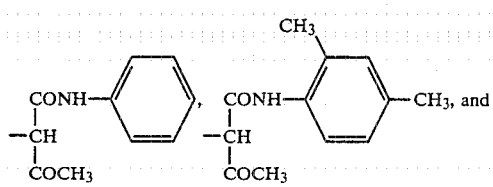

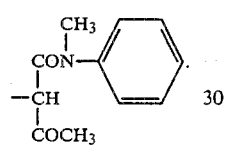

12. The photosensitive material of claim 1, wherein Y is the group represented by the formula

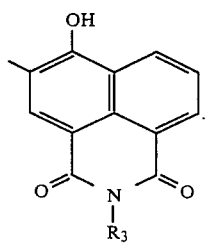

13. The photosensitive material of claim 12, wherein Y is selected from the group consisting of

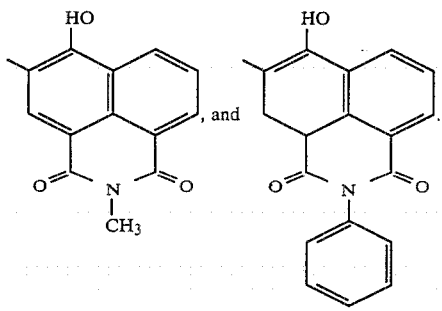

14. A photosensitive material for electrophotography, which comprises a photosensitive layer containing as a charge-generating pigment a pentakisazo pigment represented by the following formula:

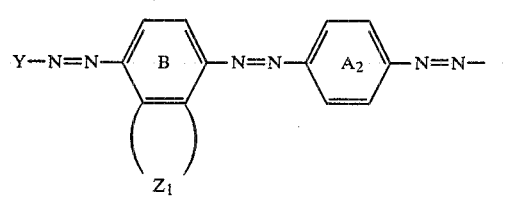

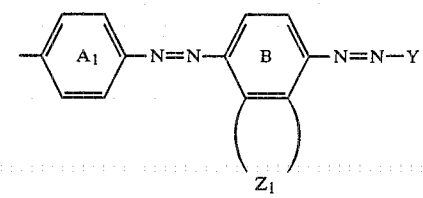

wherein the rings $A_1$ and $A_2$ may have halogen atoms, alkyl groups or alkoxy groups as substituents at the ortho-positions to the azo groups, the ring B may have a halogen atom, an alkyl group or an alkoxy group as a substitutent or may contain the ring $Z_1$, $Z_1$ is an aromatic or hetero ring fused to the benzene ring B, or a substituted derivative thereof and Y is a group represented by the following formula:

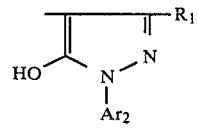

in which $Ar_2$ is an aromatic ring or a substituted derivative thereof, and $R_1$ is a lower alkyl group, a carboxyl group, or an ester thereof.

* * * * *